(12) United States Patent
Fallows

(10) Patent No.: US 9,723,069 B1
(45) Date of Patent: Aug. 1, 2017

(54) REDISTRIBUTING A CONNECTION

(71) Applicant: Kaazing Corporation, San Jose, CA (US)

(72) Inventor: John R. Fallows, Palo Alto, CA (US)

(73) Assignee: Kaazing Corporation, San Jose, CA (US)

(*) Notice: Subject to any disclaimer, the term of this patent is extended or adjusted under 35 U.S.C. 154(b) by 350 days.

(21) Appl. No.: 14/213,070

(22) Filed: Mar. 14, 2014

Related U.S. Application Data

(60) Provisional application No. 61/791,759, filed on Mar. 15, 2013.

(51) Int. Cl.
*G06F 15/16* (2006.01)
*H04L 29/08* (2006.01)

(52) U.S. Cl.
CPC ................. *H04L 67/1002* (2013.01)

(58) Field of Classification Search
CPC ............. H04L 67/1002; H04L 67/1008; H04L 67/1023; H04L 69/162; H04L 69/2814; H04L 69/1017; H04L 29/12066; H04L 61/1511; G06F 11/3433
See application file for complete search history.

(56) References Cited

U.S. PATENT DOCUMENTS

| | | | | |
|---|---|---|---|---|
| 6,304,913 B1* | 10/2001 | Rune | ................. | H04L 29/12066 709/241 |
| 7,693,991 B2* | 4/2010 | Greenlee | ................. | G06F 9/505 709/223 |
| 9,032,092 B1* | 5/2015 | Sinn | ................. | H04L 61/00 709/222 |
| 2006/0235972 A1* | 10/2006 | Asnis | ................. | H04L 29/12066 709/225 |
| 2008/0178278 A1* | 7/2008 | Grinstein | ............ | H04L 63/0227 726/12 |
| 2010/0306547 A1* | 12/2010 | Fallows | ................ | G06F 21/305 713/178 |
| 2013/0117554 A1* | 5/2013 | Ylonen | ..................... | H04L 9/08 713/151 |
| 2014/0047342 A1* | 2/2014 | Breternitz | ............. | G06F 9/5061 715/735 |

* cited by examiner

*Primary Examiner* — Tauqir Hussain
*Assistant Examiner* — Kamran Mohammadi
(74) *Attorney, Agent, or Firm* — Van Pelt, Yi & James LLP

(57) ABSTRACT

Network connection management is disclosed. Internet Protocol addresses associated with an initial host identifier of a first network node of a network cluster of a plurality of network nodes are requested. In response to the request, a plurality of IP addresses is received. For each of the received IP addresses, an alternate host identifier is discovered. A request to establish a network connection with the first network node is received from a client. It is determined whether to redirect the network connection to a second network node of the network cluster. In the event it is determined that the network connection should be redirected, one of the discovered alternate host identifiers is selected as a redirect destination identifier and providing to the client the selected alternate host identifier as the redirect destination identifier.

20 Claims, 14 Drawing Sheets

REDISTRIBUTING A CONNECTION

CROSS REFERENCE TO OTHER APPLICATIONS

This application claims priority to U.S. Provisional Patent Application No. 61/791,759 entitled REDISTRIBUTING A WEBSOCKET CONNECTION filed Mar. 15, 2013 which is incorporated herein by reference for all purposes.

BACKGROUND OF THE INVENTION

Traditional network load balancers require a centralized management server that manages load balancing among a group of network nodes eligible to be selected by the management server to distribute processing across the group of nodes. For example, requests for content from clients are received by the management server and the management server distributes the requests across the group of nodes to evenly distribute processing. However, because a single management server coordinates processing across the entire group of load balanced nodes, the management server may become a performance bottleneck if the management server becomes overloaded. Additionally, the management server may become a centralized point of failure and render the entire group of load balanced nodes nonfunctional in the event the management server encounters an error. Therefore, there exists a need for a decentralized load balancing.

BRIEF DESCRIPTION OF THE DRAWINGS

Various embodiments of the invention are disclosed in the following detailed description and the accompanying drawings.

DETAILED DESCRIPTION

Figure 1A:
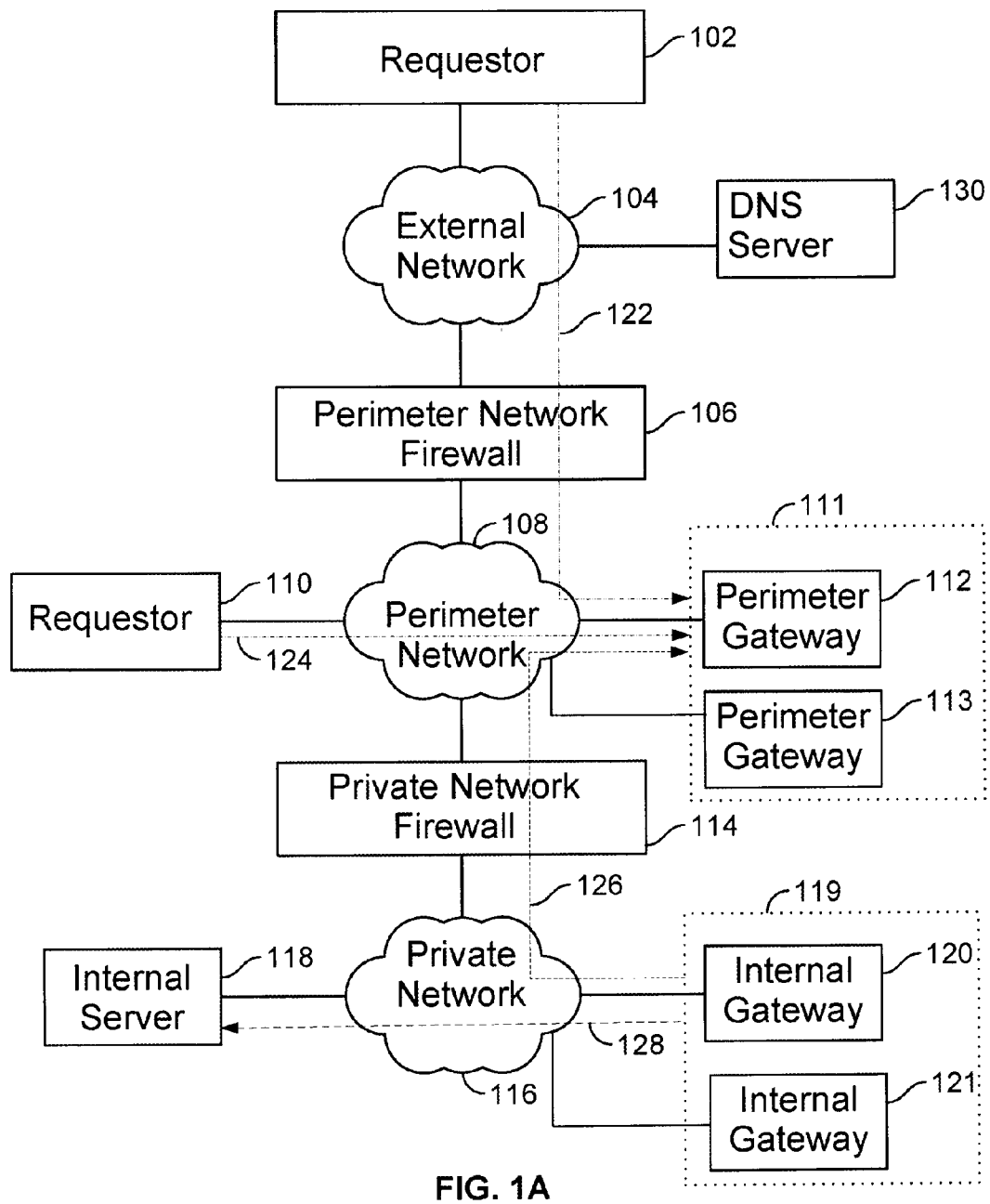
FIGS. 1A and 1B are block diagrams illustrating examples of a communication environment between a public network and a private network able to handle decentralized load balancing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Redirecting a connection is disclosed. In some embodiments, a network node that is a part of a cluster of load balanced nodes requests Internet Protocol (IP) addresses associated with a host/domain identifier of the cluster. For example, the network node queries a DNS server that is using a round-robin DNS to associate a plurality of IP addresses of the nodes of the cluster to the host identifier and it is desired to determine all the publically accessible nodes of the cluster that are reachable via the host identifier. The node of the cluster may provide redundant functionality that allows workloads to be redistributed by redirecting between the nodes of the cluster network connections to be processed. A plurality of IP addresses associated with the host identifier is received. For example, a DNS server returns the plurality of IP addresses in response to a request to resolve the host/domain identifier. An alternate host identifier associated with each of the received IP addresses is discovered. For example, each node of the cluster is associated with a unique host identifier specific to each node and a reverse DNS lookup is performed using each of the received IP addresses to determine an alternate host identifier that can be utilized to specifically reach each node (e.g., rather than the domain host identifier that maps to a plurality of nodes of the cluster). The discovered alternate host identifier may be utilized later to redirect a network connection from one node of the cluster to a specific node of the cluster identified by its alternate host identifier.

In some embodiments, a request for a network connection is received from a client. For example, the request from the client is received to utilize a service and/or obtain data via the connection. In some embodiments, the request is a request for a WebSocket connection. The connection with the client is established by a node of the cluster. It is determined whether to redirect connection to a different node of the cluster based at least in part on a load balancing factor of the node of the connection. It may be determined that the node is over loaded because its load balancing factor (e.g., system resource utilization factor) is above a threshold level and the connection should be redirected to redirect resource consumption of the connection. In the event it is determined that the connection should be redirected, one of the discovered alternate host identifiers is selected as a redirect destination. For example, another node of the cluster is selected as the redirect destination and a discovered alternate host identifier that corresponds to the selected node is determined. In some embodiments, each node of the cluster determines its load balancing factor and communicates its load balancing factor to other nodes of the cluster. Thus one node of the cluster may be aware of the load balancing factor of other clusters and, as an example, is able to select the cluster with the lowest load balancing factor as the load balancing destination node. The client is provided the selected alternate host identifier as the redirection destination. The client then may establish a redirected connection using the alternative host identifier.

Figure 1B:
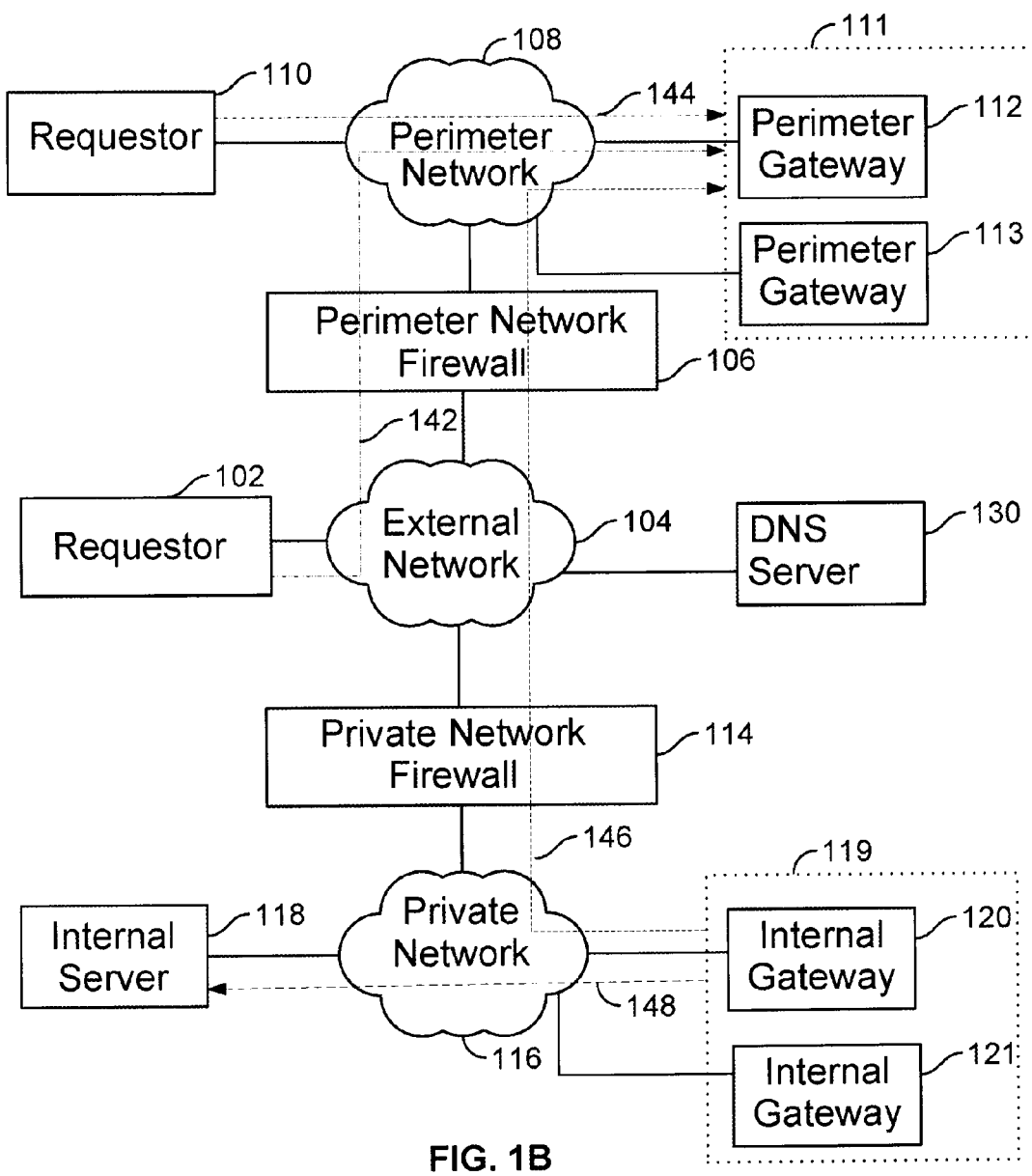

FIGS. 1A and 1B are block diagrams illustrating examples of a communication environment between a public network and a private network able to handle decentralized load balancing. In the example shown, requestor 102 and/or requestor 110 desires to access data and/or services that require access to internal server 118. In an alternative environment, requestor 102 and/or requestor 110 desires to access data and/or services of a server situated in the network configuration of perimeter gateway 112 and/or perimeter gateway 113. In some embodiments, requestor 102 and/or requestor 110 includes an internet server. For example, requestor 110 includes an internet server that provides data (content intended to be publically available such as a web content) and/or services to one or more clients connected to external network 104. Examples of requestor 102 and requestor 110 include one or more hardware or software systems (e.g., a client, a server, a virtual component, etc.), components, processes, and/or applications that desire to access data and/or services that require access to internal server 118. Examples of external network 104 include one or more of the following: a direct or indirect physical communication connection, mobile communication network, Internet, Wide Area Network, Storage Area Network, and any other form of connecting two or more systems, components, or storage devices together. Perimeter firewall 106 includes a firewall server accessible publically via external network 104 that manages access to one or more components connected to perimeter network 108. In some embodiments, perimeter firewall 106 operates to limit access by one or more of the following: a protocol type, a network, an IP address, a source address, a destination, a header, an identifier, and communication content. Examples of perimeter network 108 include one or more of the following: a direct or indirect physical communication connection, DMZ network, mobile communication network, intranet, Local Area Network, Wide Area Network, Storage Area Network, and any other form of connecting two or more systems, components, or storage devices together.

Private network firewall 114 securely isolates private network 116 and components connected to private network 116 from a network (e.g., perimeter network 108) external to private network 116. Examples of private network 116 include one or more of the following: a direct or indirect physical communication connection, mobile communication network, Wide Area Network, Storage Area Network, and any other form of connecting two or more systems, components, or storage devices together. Internal server 118 is connected to private network 116 and may host a service and/or data that is desired to be accessed by a component outside of private network 116. For example, requestor 102 desires access to a service/data hosted by internal server 118. In another example, requestor 110 desires to access service/data hosted by internal server 118 (e.g., in response to a request received at requestor 110 from an external client). In some embodiments, the security policies that define the operation of private network firewall 114 are substantially more restrictive that those employed by perimeter firewall 106. For example, the security policies of private network firewall 114 nominally restrict the allowed network connections to outbound only. This allows internal server 118 to initiate communications with requestor 110 and, directly or indirectly, access external network 104 (e.g., public Internet). Inbound connections to private network firewall 114 may be considered security exposures and therefore may be discouraged. In some embodiments, if an inbound connection port is opened on private network firewall 114, it must be actively managed. The example of FIG. 1A shows perimeter network 108 only connected to private network firewall 114. The example of FIG. 1B shows private network firewall 114 directly connected to external network 104. For example, information sent from internal server 118 to requestor 110 must first pass through private network 116, then private network firewall 114, then external network 104, then perimeter firewall 106, and then through perimeter network 108 to arrive at requestor 110. FIGS. 1A and 1B are merely examples and other network configurations may be used.

Perimeter gateway 112 and perimeter gateway 113 are connected to perimeter network 108. Perimeter gateway 112 and perimeter gateway 113 are nodes of cluster 111. Although two nodes are shown as members of cluster 111, any number of nodes may be included in cluster 111 in various embodiments. Perimeter gateway 112 and perimeter gateway 113 are able to load balance connections and/or workloads across nodes of cluster 111. For example, workloads and connections are load balanced and distributed between the nodes of cluster 111 by redirecting a connection/workload to another node of cluster 111 based on one or more load factors. In some embodiments, perimeter gateway 112 and perimeter gateway 113 provide redundant functionality. For example, an incoming connection and/or a processing to be performed may be handled either by gateway 112 or gateway 113. In some embodiments, round-robin DNS is utilized to expose a plurality of nodes of cluster 111 (e.g., DNS server 130 provides an IP address of gateway 112 and an IP address of gateway 113 in response to a DNS lookup request of a desired resource/service from requestor 102) and the client chooses (e.g., randomly) one of the nodes to request a desired resource/service. When one of the nodes (e.g., gateway 112) of cluster 111 receives a request for resource/service either from a new connection or a connection already being handled by the node, the node may determine that the node is overloaded (or determine that the node should be shutdown) and may initiate a migration of a connection/request to another node (e.g., gateway 113) of cluster 111 that is likely to have more available resources to handle the connection/request.

In some embodiments, one or more nodes of cluster 111 may enable a requestor to initiate a communication with internal server 118 without directly initiating a connection to private network firewall 114. For example, perimeter gateway 112 and perimeter gateway 113 each support inbound connections from requestor 110 (e.g., via connection 124 or connection 144) and/or requestor 102 (e.g., via connection 122 or connection 142). In some embodiments, a node of cluster 111 utilizes a connection established from a node of cluster 119 (e.g., internal gateway 120 or internal gateway 121) that is connected to private network 116 (e.g., via connection 126 or connection 146). For example, perimeter gateway 112 and/or perimeter gateway 113 hosts a reverse proxy service and obtains access to one or more components connected to private network 116 via an established connection (e.g., connection 126 or connection 146) with a node of cluster 119. Internal gateway 120 and internal gateway 121 are nodes of cluster 119. Although two nodes are shown as members of cluster 119, any number of nodes may be included in cluster 119 in various embodiments. Internal gateway 120 and internal gateway 121 are able to load balance connections and/or workload. By utilizing perimeter gateway 112/113 and internal gateway 120/121, inbound connections for internal server 118 may be supported without requiring an open port on private network firewall 114 and without requiring perimeter gateway 112 to possess security compromising information of private network 116 protected by private network firewall 114. In some embodiments, by utilizing perimeter gateway 112/113 and internal gateway 120/121, the security risk assessment of an enterprise network, specifically for a private network, may remain substantially unchanged when allowing incoming connections. In some embodiments, perimeter gateway 112/113 and internal gateway 120/121 may be used to bypass one or more levels and/or zones of a network configuration such as one or more DMZs of a network with multiple DMZs.

In some embodiments, internal server 118 may be implemented as a computer server. Internal server 118 hosts one or more services. Examples of services hosted by internal server 118 include a network file server service, a calendaring or other customer relations management (CRM) service, a network-based videoconferencing service, relational database services, and other services provided by a networked server.

In some embodiments, perimeter gateway 112 and/or perimeter gateway 113 may include a conventional computer server with dual network interfaces, permitting independent connectivity to private network firewall 114 and to a requestor (e.g., requestor 110 or requestor 102 of FIG. 1A or 1B). In some embodiments, perimeter gateway 112 and/or perimeter gateway 113 hosts a reverse proxy server as a service accessible (e.g., exclusively) by a requestor. In some embodiments, configuration data is loaded by the reverse proxy server from a local data store of perimeter gateway 112 and/or perimeter gateway 113. In some embodiments, perimeter gateway 112 and/or perimeter gateway 113 includes an authentication manager that handles connection authentication (e.g., by accessing an LDAP (Lightweight Directory Access Protocol), KERBEROS, or other external secure certificate authority) with internal gateway 120, internal gateway 121, and/or a requestor. In some embodiments, authentication is at least in part handled by a component external to perimeter gateway 112 and/or perimeter gateway 113 such as a trusted third party (e.g., a certificate authority). In some embodiments, a reverse proxy server included in perimeter gateway 112 and/or perimeter gateway 113 may be implemented as a reverse SOCKS (SOCKet Secure) server extended to add configuration, connection, and authentication behaviors. For example, a reverse SOCKS proxy daemon listens for client connection requests on one or more ports. Requests inbound on these open ports are passed to the reverse SOCKS proxy for binding. When an incoming connection is bound, the reverse SOCKS proxy may select and establish a connection to a corresponding service (e.g., an application executed on a server computer system to provide a defined function, such as database serving or e-mail delivery). A reverse SOCKS proxy may be provided with local configuration data that identifies the services and corresponding server systems capable of handling the requested communications.

In some embodiments, internal gateway 120 and/or internal gateway 121 includes a conventional computer server with dual network interfaces. In some embodiments, a proxy client is hosted on internal gateway 120 and/or internal gateway 121. Configuration data that defines the operational behavior of the proxy client may be obtained from a local configuration data store of internal gateway 120 and/or internal gateway 121. In some embodiments, the proxy client, in combination with a connection manager included in internal gateway 120 and/or internal gateway 121, operates autonomously to establish network connections with a hosted service of internal server 118 (e.g., via connection 128 or connection 148) and a reverse proxy server of perimeter gateway 112 and/or perimeter gateway 113 (e.g., via connection 126 or connection 146), the latter being routed through private network firewall 114. In some embodiments, because the connection (e.g., connection 126 or connection 146) between the proxy client of internal gateway 120 and/or internal gateway 121 and the proxy server of perimeter gateway 112 and/or perimeter gateway 113 is outbound relative to internal gateway 120 and/or internal gateway 121 and persistent, open ports are not required on private network firewall 114. In some embodiments, the proxy client of internal gateway 120 and/or internal gateway 121, independently or in response to the operation of a connection manager included in internal gateway 120 and/or internal gateway 121, periodically polls the proxy server of perimeter gateway 112 for the presence of a then currently pending connection. For example, where a pending connection is present, the polling connection can be either consumed by the proxy server as the corresponding proxy connection or used to direct creation of a new connection for the pending connection. In some embodiments, in the absence of a pending connection, the polling connection may be dropped temporarily to conserve resources.

In some embodiments, requestor 110 or another server may be operated as a broker for pending connections. For example, perimeter gateway 112 and/or perimeter gateway 113 will message the broker server over respective established connections when new connection requests are received. Internal gateway 120 and/or internal gateway 121 may poll the broker server for the presence of a pending connection specific to the internal gateway. Where a corresponding connection is pending, the broker server will message internal gateway 120 and/or internal gateway 121 with sufficient information to enable internal gateway 120 and/or internal gateway 121 to establish a connection with the correct perimeter gateway.

In some embodiments, one or more nodes of cluster 111 and one or more nodes of cluster 119 may communicate through multiplexed connections. For example, multiple logical connections, each corresponding to a separate connection, are passed over a single or reduced number of actual network connections established between perimeter gateway 112 and internal gateway 120. One or more nodes of cluster 119 may establish a multiplexed channel identifier for each logical connection that is shared with one or more nodes of cluster 111 when a new logical connection is created. The multiplexed logical connections may be transparent to internal server 118 and a requestor connected to one or more nodes of cluster 111. In some embodiments, a communication protocol such as SPDY (developed by Google, Inc. of Mountain View, Calif.) is utilized on top of a connection between one or more nodes of cluster 111 and one or more nodes of cluster 119 to enable the multiple logical connections.

In some embodiments, one or more nodes of cluster 119 establishes a dedicated command/control connection with one or more nodes of cluster 111 to enable monitoring and communication of connection requirements of one or more nodes of cluster 111. For example, in heavy use situations, the rate and nature of connection requests to perimeter gateway 112 to access one or more components of private network 116 can be observed by internal gateway 120, allowing proactive creation of an appropriate number and/or type of connection from internal gateway 120 to perimeter gateway 112. A pool of available connections, logical or real, may be maintained and efficiently used by one or more nodes of cluster 119 to quickly establish new connections while conserving resources. In various embodiments, one or more nodes of cluster 119 and/or one or more nodes of cluster 111 may include memory and/or storage that tracks logical correspondences between bound incoming and outgoing connections. In some embodiments, one or more connections may be disconnected, removed, created, and/or modified based at least in part on a utilization/availability of one or more connection resources.

In various embodiments, the components shown in FIGS. 1A and 1B may exist in various combinations of hardware machines. One or more of the components shown in FIGS. 1A and 1B may be included in the same machine. Other communication paths may exist and the examples of FIGS. 1A and 1B have been simplified to illustrate the example clearly. Although single instances of components have been shown to simplify the diagram, additional instances of any of the components shown in FIGS. 1A and 1B may exist. For example, multiple requestors may make simultaneous multiple requests for services/content of multiple internal servers via one or more nodes of cluster 111 and one or more nodes of cluster 119. Components not shown in FIGS. 1A and 1B may also exist.

Figure 15:
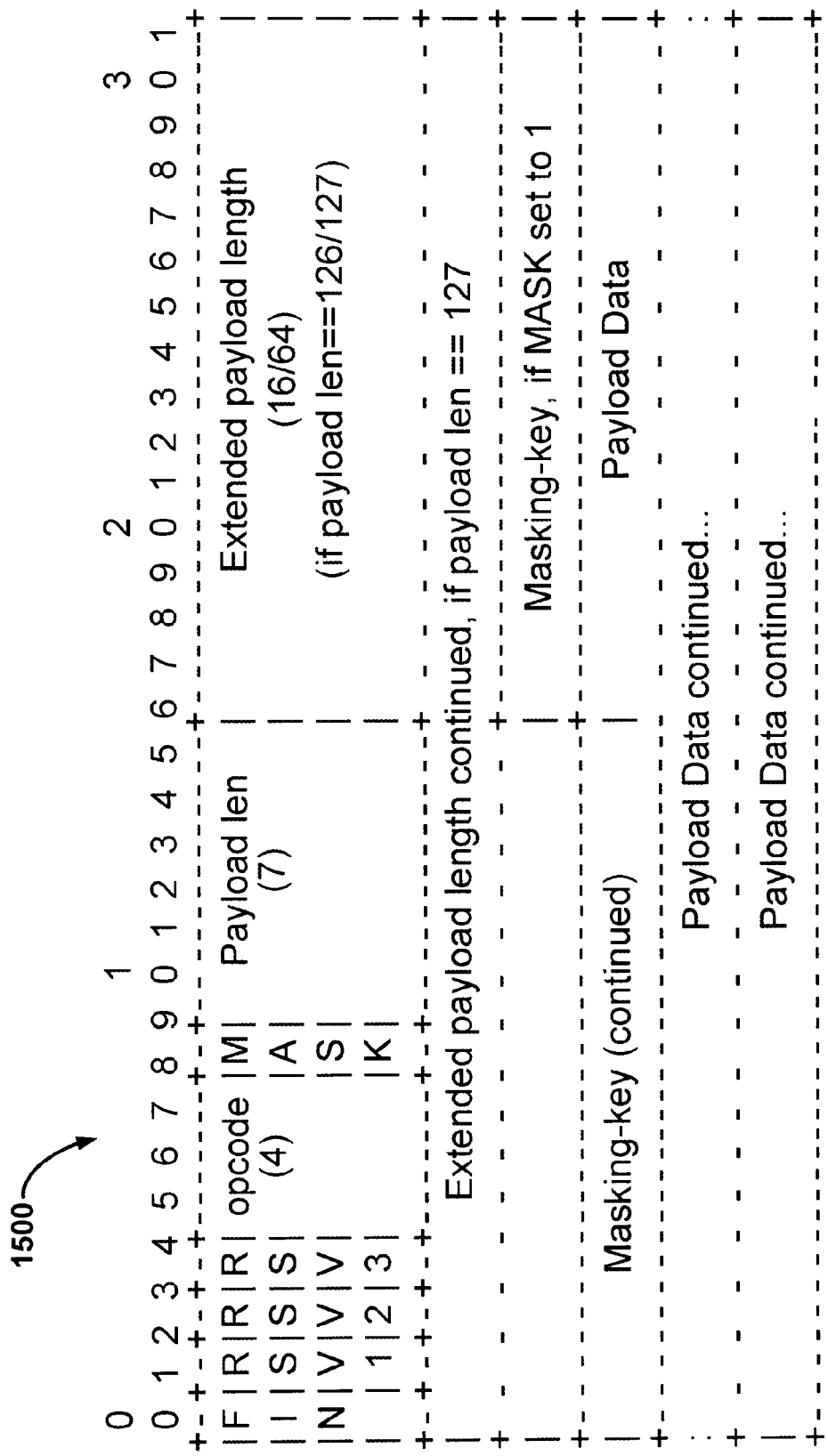
FIG. 15 is a diagram illustrating a table showing types bits included in an example WebSocket frame.

The WebSocket protocol has been standardized by the Internet Engineering Task Force (IETF) standards organization as RFC 6455 (available at http://tools.ietf.org/html/rfc6455) RFC 6455 includes details on the initialization handshake and data framing of the WebSocket protocol As specified in RFC 6455, once a WebSocket connection has been established using the handshake process between at least two communicating nodes, WebSocket communication is performed by transmitting WebSocket frames A high-level overview of bits contained in a WebSocket frame is given in the following table 1500 of Figure 15 reproduced from RFC 6455.

As shown in table 1500 of FIG. 15, the beginning portions of a WebSocket frame include metadata information regarding configuration of data contained in the WebSocket frame. Additional details on the groups of bits in the WebSocket frame may be found in RFC 6455. The ending section of the WebSocket frame includes the actual payload data (e.g., application level data). The location of the payload data within the WebSocket frame may vary depending on the size of the payload data and whether a masking key is utilized. WebSocket frames are base units of communication data framing in WebSocket communication. By default, the WebSocket Protocol may use port 80 for regular WebSocket connections and port 443 for WebSocket connections tunneled over Transport Layer Security (TLS).

Figure 1C:
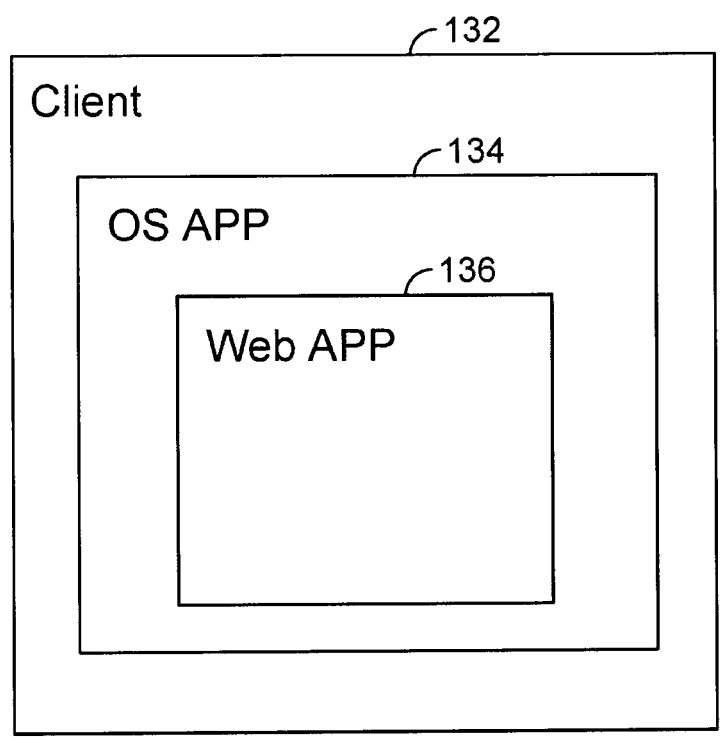
FIG. 1C is a diagram illustrating a WebSocket client.

FIG. 1C is a diagram illustrating a WebSocket client. In some embodiments, client 132 is included in one or more of the following: requestor 102 of FIG. 1A, requestor 110 of FIG. 1A, requestor 102 of FIG. 1B, and requestor 110 of FIG. 1B. Examples of client 132 include a computer, a tablet device, a smartphone, and any computing device. Client 132 may be used by a user to access services and/or content at least in part provided by a server (e.g., internal server 118). For example, the server hosts web content that is obtained by client 132. In some embodiments, an HTTP/HTTPS connection of client 132 is requested by client 132 to be upgraded to a WebSocket connection.

A server may handle the request and communicate with client 132 using the WebSocket protocol. For example, the server is connected to a WebSocket gateway (e.g., perimeter gateway 112), and the WebSocket gateway handles WebSocket upgrade requests, a WebSocket initialization handshake, and handling of WebSocket frames for a content source server. The WebSocket gateway may proxy communication, at least in part by allowing the WebSocket gateway to encode communication sent by a content source server into WebSocket frames to be sent to client 132 and decoding WebSocket frames from client 132 into a data format desired by the content source server.

Client 132 includes operating system level application (OS App) 134. OS App 134 is hosting web application 136. For example, OS App 134 is a web browser and web application 136 is a Javascript application executed using the web browser. In another example, OS App 134 is a mobile device application and web application 136 is a component of the mobile device application. Other examples of OS App 134 include any application executing on an operating system hosted by client 132. In some embodiments, protocol level processing of WebSocket communication is handled by OS App 134 for web application 136. For example, when a WebSocket connection is requested by web application 136, OS App 134 handles the handshake, protocol control, protocol configuration, and WebSocket frame and message processing to allow only the web application level data contained in a payload portion of a WebSocket frame to be sent to web application 136. In some embodiments, web application 136 may process select sets of WebSocket control configurations. Additional OS applications and web applications may be hosted by client 132. Components not shown in FIG. 1C may also exist.

Figure 2:
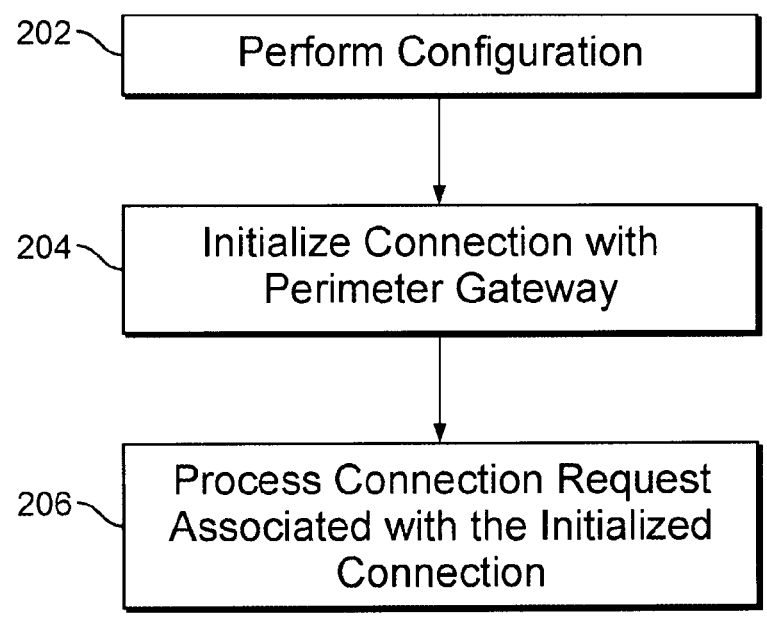
FIG. 2 is a flow chart illustrating an embodiment of a process for initializing a communication link.

FIG. 2 is a flow chart illustrating an embodiment of a process for initializing a communication link. In some embodiments, the process of FIG. 2 is implemented on internal gateway 120 and/or internal gateway 121 of FIG. 1A and/or FIG. 1B.

At 202, a configuration is performed. In some embodiments, performing the configuration includes receiving configuration data and using the received configuration data to perform the configuration. In some embodiments, the configuration data specifies a connection to be established and includes one or more of the following: a connection identifier, a network address, a protocol identifier, a Uniform Resource Identifier (URI), a port number, proxy connection information, and a specification of a connection option.

Table 1 below provides an illustrative example of configuration data used to perform the configuration.

Table 1: Internal Gateway Configuration

```
<service>
    <accept>pipe://service-1</accept>
    <connect>tcp://internal-server:5555</connect>
    <type>proxy</type>
    <accept-options>
        <pipe.transport>socks.ssl://perimeter-gateway:4444</pipe.transport>
        <socks.mode>reverse</socks.mode>
        <socks.maximum.retry.interval>5 sec</socks.maximum.retry.interval>
    </accept-options>
</service>
```

In Table 1 above, the first service tag statement defines a logical connection to be established between a perimeter gateway (e.g., perimeter gateway 112 of FIG. 1A or 1B), "perimeter-gateway," and a service provided by an internal server (e.g., internal server 118 of FIG. 1A or 1B), "internal-server," on port 5555. The accept tag statement specifies the URI that may be utilized by the perimeter gateway to connect to the specified service (e.g., tcp://internal-server:5555) provided by the internal server. The prefix "pipe://" defines that a generic communication pipe is being established and any supported communication protocol may be used. In some embodiments, a communication protocol and/or a type of connection that must be used may be specified in the URI included in the accept tag statement. In some embodiments, a specific protocol, such as TCP, SSL, WS, WSS, UDP, SPDY, etc., may be specified in the prefix. For example, the URI "wss://internal-gateway:443/service-1" may be used to specify that a WSS connection must be utilized. In some embodiments, another communication protocol such as SPDY may be utilized by the WSS connection to allow multiplexing of connections. The connect tag statement defines the connection protocol, location identifier, and port number for one or more services of an internal server (e.g., internal server 118 of FIG. 1A or 1B) to be connected. The pipe.transport and the socks.mode tag statements define the network protocol (e.g., SOCKS and SSL) and a connection path (e.g., "perimeter-gateway:4444") that will be used to initiate a connection with the perimeter gateway to establish a specified type (e.g., reverse) of proxy connection. For example, the pipe.transport tag specifies the address of a reverse socks proxy server in the perimeter gateway. An optional socks.connect.maximum.retry.interval statement is used to define a maximum time interval between each attempt to connect to a perimeter gateway to establish a reverse proxy connection. Repeated connection attempts may be progressively delayed up to the specified interval in seconds. In some embodiments, the configuration specifies that connections should be established with a plurality of perimeter gateways. For example, an internal gateway is configured to establish a connection with each of a plurality of perimeter gateways (e.g., all nodes of cluster 111). In some embodiments, the configuration specifies a network location identifier associated with a plurality of perimeter gateways. For example, a host identifier maps to a plurality of IP addresses using a DNS server (e.g., internal DNS server), and connections are to be established with the plurality of the IP addresses. A plurality of connection paths for the perimeter gateways may be specified in the configuration data. By establishing a plurality of connections with different perimeter gateways (e.g., redundant gateways of a cluster), an internal gateway may be able to quickly switch between perimeter gateways in the event one perimeter gateway becomes non-operational and/or to load balance between perimeter gateways.

Although the example above shows an internal gateway being preconfigured with internal server service location identifiers, protocol specifications, and other configuration information, in other embodiments, at least portions of the information configured using the configuration data of Table 1 may be dynamically configured. For example, location of a desired service of an internal server may be provided by the perimeter gateway when a connection request is received from the perimeter gateway.

At 204, a connection with a perimeter gateway is initialized. In some embodiments, the perimeter gateway includes perimeter gateway 112 and/or 113 of FIG. 1A and/or FIG. 1B. In some embodiments, initializing the connection (e.g., communication link) includes establishing an authenticated connection with the perimeter gateway (e.g., reverse proxy server included in the perimeter gateway). For example, connection 126 of FIG. 1A is established. In another example, connection 146 of FIG. 1B is established. In some embodiments, an established connection is to be utilized by the perimeter gateway to provide a reverse proxy service to an internal server via an internal gateway that is initiating the connection. The authenticated connection may be established using public key cryptography, certificate authentication, and/or any other way of establishing a secure connection. In some embodiments, the authentication is performed as an automated machine-to-machine authentication. In some embodiments, the connection is established through a private network firewall such as private network firewall 114 of FIG. 1A and/or FIG. 1B. The information required to initialize the connection may be preconfigured (e.g., using configuration data of step 202) and/or dynamically determined. For example, in some embodiments, the dynamic determination is accomplished using a table, a database, a service (e.g., a networked naming service), a resource indicator and/or other dynamically changing/updated information. In some embodiments, if a secure authenticated connection cannot be established, the process ends and an error message is provided. In some embodiments, the initialized connection may only allow a limited functionality/communication to maintain security of a private network. For example, only predetermined communication may be communicated via the connection. In some embodiments, if a connection to the perimeter gateway cannot be established, the connection is reattempted a predetermined number of times before the process ends and an error message is provided.

In some embodiments, the initialized connection is a secure encrypted connection and an unencrypted protocol utilized over the connection is effectively encrypted. In the example shown in Table 1, the connection with a perimeter gateway is initialized using the protocol and address path specified using the "pipe.transport" tag statement. Utilizing the SOCKS protocol is merely an example, in that a variation of the SOCKS protocol and/or another protocol may be used to initialize/establish/utilize a reverse proxy connection. In some embodiments, the established connection is a multiplexed connection. For example, the established connection utilizes SPDY protocol or any other multiplexing protocol that allows multiple logical connections on a single established connection.

In some embodiments, initializing the connection includes providing a connection identifier of the connection to the perimeter gateway. In some embodiments, the identifier identifies the established connection and/or the connection that can be used by the perimeter gateway to utilize the connection (e.g., connect to data/services of an internal server protected by a private network firewall). In some embodiments, the connection identifier is provided via the connection. In some embodiments, the connection identifier is preconfigured and specified in a configuration file of an internal gateway and/or perimeter gateway. For example, Table 1 shows the connection identifier "pipe://service-1." The perimeter gateway may utilize this URI to request a connection to an internal server of a private network. Although this example utilizes the generic pipe prefix, in various embodiments, any of a plurality of protocols may be specified and utilized in the connection between the internal gateway and the perimeter gateway. In some embodiments, the connection identifier is utilized by an internal gateway to monitor connection requests utilizing the connection identifier. In some embodiments, the internal gateway monitors the established connection for a connection request from the perimeter gateway. In some embodiments, the connection identifier identifies one of a plurality of logical connections of a multiplexed connection.

In some embodiments, timing associated with the connection is controlled statically and/or dynamically using one or more of the following: a heuristic, a process, a rule, a security policy, received information, and dynamically updated/changing information. For example, the timing of when a new logical connection may be formed is controlled by controlling the timing associated with when the connection at 204 is initialized. The timing of the connection may be controlled to reduce the amount of time and/or probability that the connection and/or one or more network components of the connection could be compromised by a security attack. Examples of the timing associated with the connection include when the connection is initialized, a length of time the connection is attempted to be initialized, a number of times the connection is attempted to be initialized, a length of the connection, and one or more timing parameters associated with connection and/or initialization of the connection.

In some embodiments, a plurality of connections is initialized with a plurality of perimeter gateways. For example, a connection is established for each of a plurality of perimeter gateways included in cluster 111.

At 206, a connection request associated with the initialized connection is processed. In some embodiments, processing the connection request includes receiving a connection request from a perimeter gateway (e.g., from one of a plurality of perimeter gateways connected to an internal gateway). For example, the perimeter gateway receives a connection request from a requestor to access data/service of an internal server not directly accessible by the requestor, and the perimeter gateway sends a connection request to the internal gateway to request access to the internal server via the connection. In some embodiments, a connection request is provided using a connection identifier and the connection identifier is utilized to associate together (e.g., bind) a connection between an internal server with an internal gateway (e.g., connection 128 of FIG. 1A or connection 148 of FIG. 1B) together with the connection between the perimeter gateway and the internal gateway (e.g., connection 126 of FIG. 1A or connection 146 of FIG. 1B). In some embodiments, the connection request is received via the initialized connection. In some embodiments, the connection request is received on a connection separate from the initialized connection. For example, a separate control connection is established between the internal gateway and the perimeter gateway and the control connection is utilized to communicate information required to establish and/or manage one or more connections utilized to access an internal server.

Figure 3:
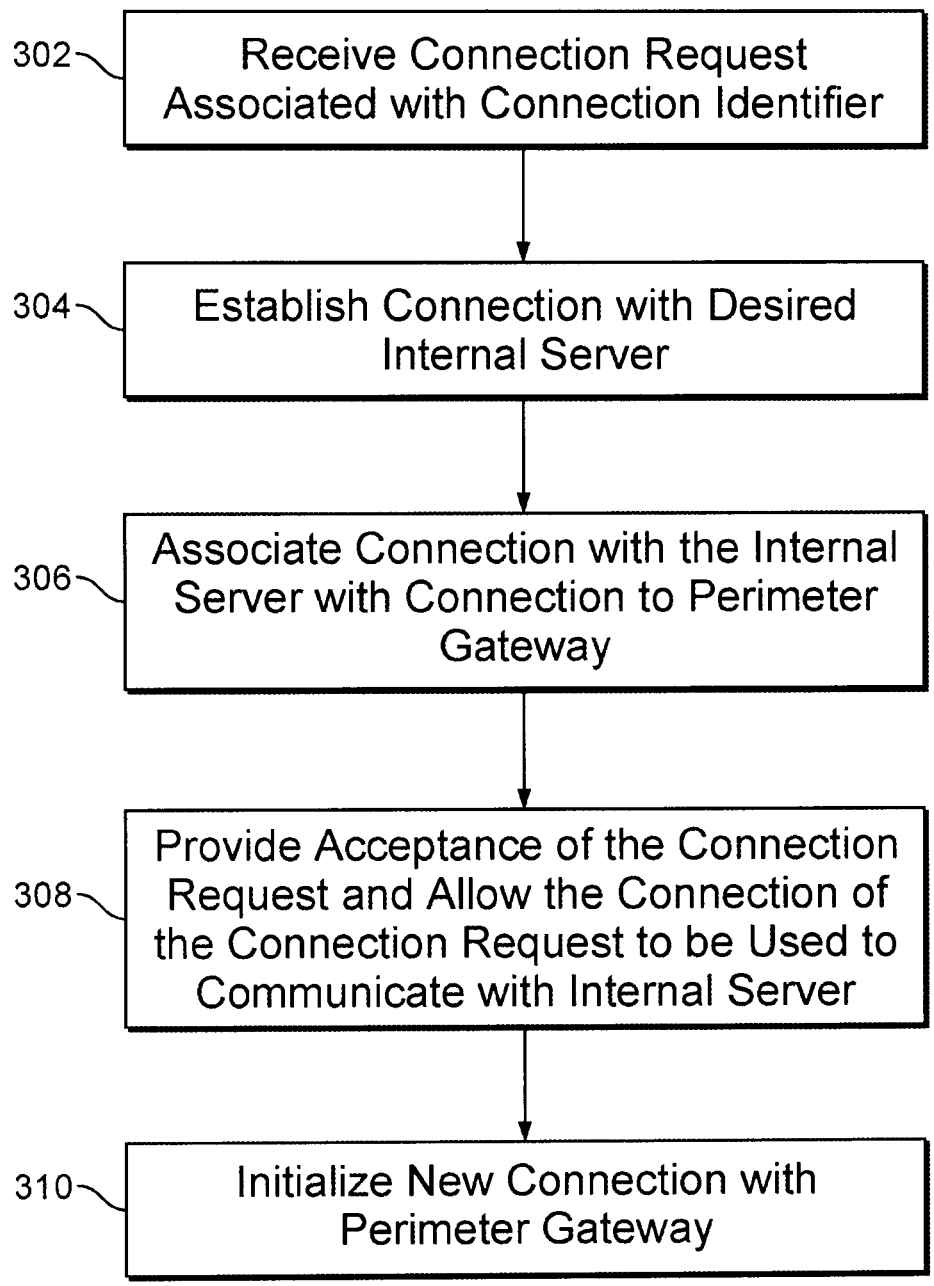
FIG. 3 is a flow chart illustrating an embodiment of a process for processing a connection request.

FIG. 3 is a flow chart illustrating an embodiment of a process for processing a connection request. The process of FIG. 3 may be implemented on internal gateway 120 and/or internal gateway 121 of FIG. 1A and/or FIG. 1B. In some embodiments, the process of FIG. 3 is included in 206 of FIG. 2.

At 302, a connection request associated with a connection identifier is received. In some embodiments, the received connection request is associated with a connection identifier associated with steps 204 and/or 206 of FIG. 2. For example, a perimeter gateway receives a connection request from a requestor to access data/service of an internal server not directly accessible by the requestor, and the perimeter gateway sends a connection request to an internal gateway to request access to the internal server via the connection.

At 304, a connection with a desired internal server is established. In some embodiments, establishing the connection includes establishing connection 128 of FIG. 1A. In some embodiments, establishing the connection includes establishing connection 148 of FIG. 1B. In some embodiments, establishing the connection includes establishing a connection with a specific service/data (e.g., specific port number) of the internal server. In some embodiments, establishing the connection includes establishing the connection using a preconfigured location identifier (e.g., included in a configuration data utilized at 202 of FIG. 2). In some embodiments, establishing the connection includes dynamically determining a location of a desired internal server and/or a service of the desired internal server. For example, the request received at 302 includes an identifier of a desired internal server and/or a desired data/service, and the identifier is used to dynamically determine a location address utilized to connect with the desired internal server. In some embodiments, the determination is accomplished using a table, a database, a service, a resource indicator and/or other dynamically changing/updated information. In some embodiments, if the connection with the desired internal server cannot be established, the connection is reattempted a predetermined number of times before ending the process and providing an error message.

At 306, the connection with the internal server is associated with a connection to a perimeter gateway. In some embodiments, the connection to the perimeter gateway includes the connection established at 204 of FIG. 2. In some embodiments, the connection to the perimeter gateway is the connection used to receive the request in 302. In some embodiments, associating together the connection includes binding the connections. In some embodiments, associating together the connection includes allowing communications to pass through between the connections. In some embodiments, associating together the connections includes associating together an identifier of the connection with the internal server with an identifier of the connection to the perimeter gateway. In some embodiments, associating together the connections includes associating together a connection with the internal server with a logical connection of a multiplexed connection to a perimeter gateway.

At 308, an acceptance of the connection request is provided, and the connection associated with the connection request is allowed to be used to communicate with the internal server. In some embodiments, providing the acceptance includes providing a notification to a perimeter gateway that the perimeter gateway can utilize the connection to the internal server. In some embodiments, allowing the connection to be utilized includes proxying communication between the connection with the desired internal server and the connection to the perimeter gateway.

At 310, a new connection with the perimeter gateway is initialized. In some embodiments, initializing the new connection includes establishing the new connection. In some embodiments, the new connection is initialized to allow a new connection request for data/service of an internal server to be processed using the new connection because a previously established connection has been utilized at 306 and 308. In some embodiments, initializing the new connection includes performing at least a portion of the process of FIG. 2. In some embodiments, the configuration information utilized to initialize the new connection may be preconfigured and/or received from a perimeter gateway. In some embodiments, at 310, a single new connection is established after a previously established connection has been associated (e.g., bound) with a connection to a desired internal server. In some embodiments, a plurality of new connections is initialized at the same time. For example, serialized initiation of a single new connection after each previously established communication is bound may be inefficient when there exists a known large number of new connections to be bound. In some embodiments, a perimeter gateway provides an identifier associated with a number of pending connections to be bound, and the gateway initializes a number of new connections based on the number of pending connections. In some embodiments, the identifier associated with a number of pending connections is obtained by an internal gateway at least in part by polling and/or requesting information from the perimeter gateway. In some embodiments, initializing the connection includes initializing a new logical connection of a multiplexed connection connecting an internal gateway and a perimeter gateway.

Figure 4:
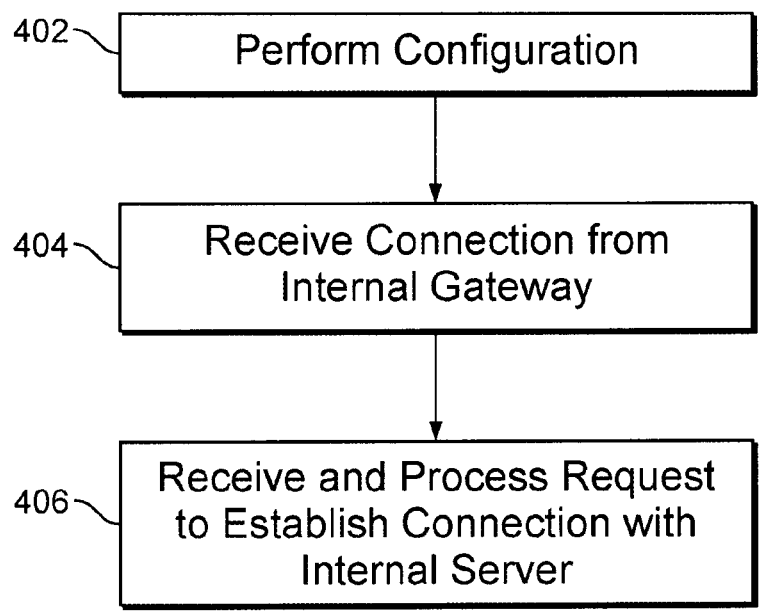
FIG. 4 is a flow chart illustrating an embodiment of a process for receiving a connection.

FIG. 4 is a flow chart illustrating an embodiment of a process for receiving a connection. In some embodiments, the process of FIG. 4 is implemented on perimeter gateway 112 and/or perimeter gateway 113 of FIG. 1A and/or FIG. 1B.

At 402, a configuration is performed. In some embodiments, performing the configuration includes receiving configuration data and using the received configuration data to perform the configuration. In some embodiments, the configuration data specifies a connection used to provide a reverse proxy service. The specification of the connection may include one or more of the following: a connection identifier, a network address, a protocol identifier, a Uniform Resource Identifier (URI), a port number, an Internet Protocol identifier, proxy connection information, and a specification of a connection option.

Table 2 below provides an illustrative example of a configuration data used to perform the configuration.

Table 2: Perimeter Gateway Configuration

<service>
  <accept>ws://perimeter-gateway/service-1</accept>
  <connect>pipe://service-1</connect>
  <type>proxy</type>
  <connect-options>
    <pipe.transport>socks.ssl://perimeter-gateway:4444</pipe.transport>
    <socks.mode>reverse</socks.mode>
    <socks.ssl.client.certificate>required</socks.ssl.client.certificate>
  </connect-options>
</service>

In Table 2 above, the service tag statement defines a potential logical connection between a requestor (e.g., requestor 102 or 110 of FIG. 1A or 1B) communicating to the perimeter gateway via the "ws://perimeter-gateway/service-1" URI, and a connection with an internal gateway identified by connection identifier "pipe://service-1." The accept tag statement specifies an identifier of a connection where a request for a connection with a private internal server may be received. The connect tag statement of Table 2 corresponds to the accept tag statement in Table 1 and specifies the connection to be utilized to bind the request received via the accept tag statement in Table 2. The pipe.transport tag statement identifies the access protocol and path of a proxy server included in the perimeter gateway where a connection from an internal gateway may be received to establish a reverse proxy connection. The socks.mode tag statement specifies the type of SOCKS proxy (e.g., reverse) connection to be established. An optional socks.ssl.require.certificate tag statement specifies that a client certificate, matching the parameter pattern, is required by the perimeter gateway. Although the example above shows a perimeter gateway being preconfigured, in other embodiments, at least portions of the information configured using the configuration data of Table 2 may be dynamically configured. For example, in some embodiments, the dynamic configuration is accomplished using dynamically received information (e.g., from an internal gateway).

At 404, a connection from an internal gateway is received. In some embodiments, the internal gateway includes internal gateway 120 of FIG. 1A and/or FIG. 1B. In some embodiments, the received connection includes the connection initialized in 204 of FIG. 2. In some embodiments, the received connection includes connection 126 of FIG. 1A. In some embodiments, the received connection includes connection 146 of FIG. 1B. In some embodiments, the received connection is to be utilized to provide a reverse proxy service to an internal server via an internal gateway that is initiating the connection. In some embodiments, the connection is a secure connection and may be established using public key cryptography, certificate authentication, and/or any other way of establishing a secure connection. In some embodiments, the authentication is performed as an automated machine-to-machine authentication. In some embodiments, the authentication is a mutual authentication between a perimeter gateway and an internal gateway. In some embodiments, the connection is received through a private network firewall such as private network firewall 114 of FIG. 1A and/or FIG. 1B. In some embodiments, the connection is received through a private network firewall and a perimeter firewall such as perimeter firewall 106 of FIG. 1A and/or FIG. 1B. The information required to receive the connection may be preconfigured (e.g., using configuration data of step 402) and/or dynamically determined. For example, in some embodiments, the dynamic determination is accomplished using dynamically received information (e.g., from an internal gateway). In some embodiments, if a secure authenticated connection cannot be established, the process ends, an error message is provided, and the connection is not accepted.

In some embodiments, the received connection is a secure encrypted connection and an unencrypted protocol utilized over the connection is effectively encrypted. In the example shown in Table 2, the connection from the internal gateway is received using the protocol and a location address specified using the "pipe.transport" tag statement. Utilizing the SOCKS protocol is merely an example, a variation of the SOCKS protocol and/or another protocol may be used to initialize/establish/utilize a reverse proxy connection. In some embodiments, the established connection is a multiplexed connection. For example, the established connection utilizes SPDY protocol or any other multiplexing protocol and allows multiple logical connections on a single established connection.

In some embodiments, receiving the connection includes receiving a connection identifier of the connection from the internal gateway. In some embodiments, the identifier identifies the received connection and/or the identifier used to utilize the connection (e.g., connect to data/services of an internal server via the connection of the identifier). In some embodiments, the connection identifier is provided via the connection. In some embodiments, the connection identifier is preconfigured and specified in a configuration file of an internal gateway and/or perimeter gateway. For example, Table 2 shows the connection identifier "pipe://service-1." This identifier may be stored and utilized to request a connection to an internal server of a private network. Although this example utilizes a generic pipe prefix, in various embodiments, any of a plurality of protocols may be specified and utilized in the connection between the internal gateway and the perimeter gateway. For example, the URI "wss://internal-gateway:443/service-1" may be utilized to specify the WSS protocol. In some embodiments, the connection identifier identifies one of a plurality of logical connections of a multiplexed connection.

At 406, a request to establish a connection with an internal server is received and processed. In some embodiments, the request is received from a requestor such as requestor 102 (e.g., via connection 122 or connection 142) and/or requestor 110 (e.g., via connection 124 or connection 144) at perimeter gateway 112 or 113 to access internal server 118 of FIGS. 1A and/or 1B. In some embodiments, the internal server may be a server directly connected to perimeter network 108 or external network 104 of FIGS. 1A and 1B. In some embodiments, the request includes an identifier of a desired data, service and/or system to be accessed. In some embodiments, processing the request includes determining an appropriate connection identifier of a connection with an appropriate internal gateway to service the request. In some embodiments, processing the request includes binding the request with an appropriate connection with an appropriate internal gateway to service the request. In some embodiments, if an appropriate connection and/or an appropriate internal gateway cannot be determined, the process ends and an error message is provided. In some embodiments, the connection may be redirected to another server (e.g., another node of cluster 119). For example, based on a load balancing factor, the connection may be redirected to another redundant network node.

Figure 5:
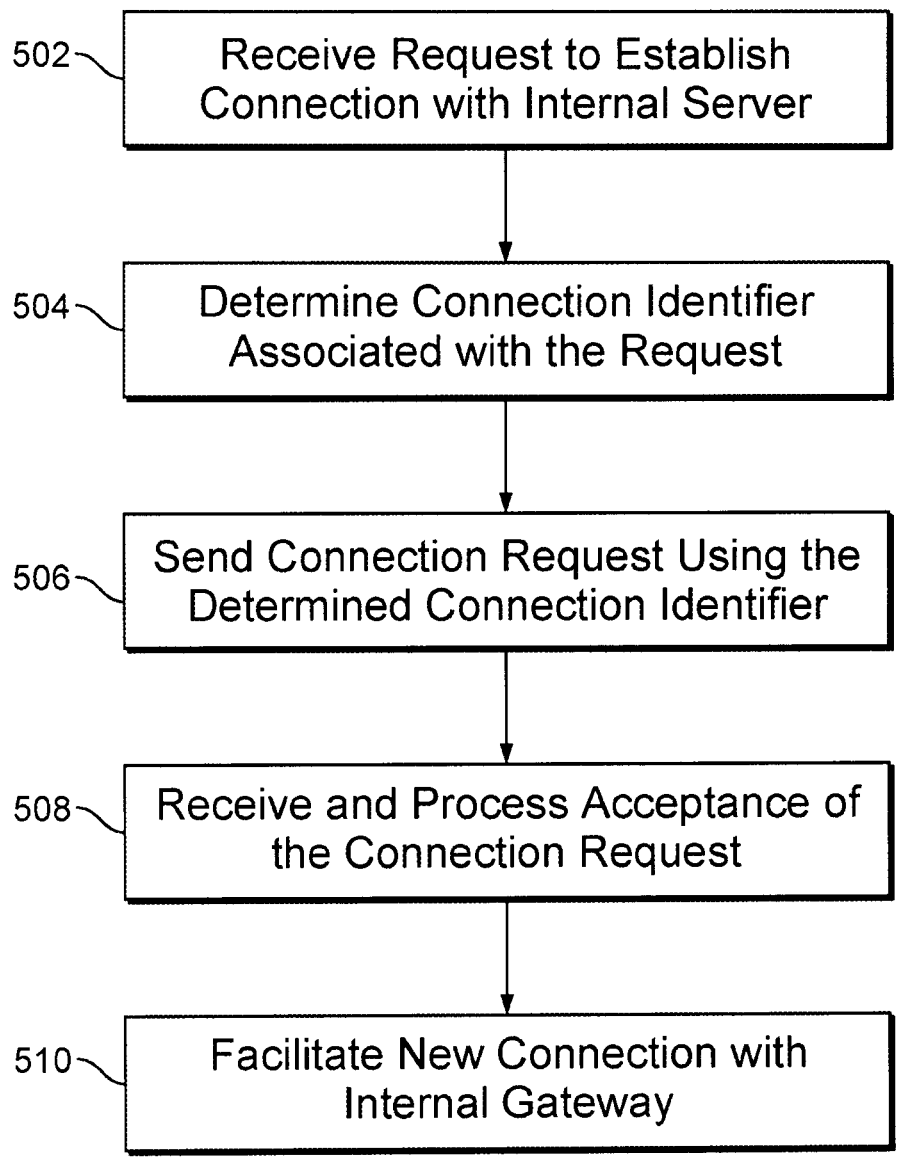
FIG. 5 is a flow chart illustrating an embodiment of a process for processing a connection request.

FIG. 5 is a flow chart illustrating an embodiment of a process for processing a connection request. The process of FIG. 5 may be implemented on perimeter gateway 112 and/or perimeter gateway 113 of FIG. 1A and/or FIG. 1B. In some embodiments, the process of FIG. 5 is included in 406 of FIG. 4.

At 502, a request to establish a connection with an internal server is received. In some embodiments, the received connection request is associated with the request received at 406 of FIG. 4. In some embodiments, the request is received from a requestor such as requestor 102 and/or requestor 110 at perimeter gateway 112 or 113 to access internal server 118 of FIGS. 1A and/or 1B. In some embodiments, the request may be redirected to another server (e.g., another node of cluster 111). For example, based on a load balancing factor, the request may be redirected to another redundant network node.

At 504, a connection identifier associated with the request is determined. In some embodiments, determining the connection identifier includes determining an appropriate connection identifier of a connection among a plurality of identifiers associated with one or more internal gateways. In some embodiments, the request includes an identifier of a desired data, service and/or system to be accessed, and this identifier is used to determine the connection identifier. In some embodiments, the connection identifier includes a connection identifier provided in 204 of FIG. 2. In some embodiments, the connection identifier may be preconfigured based on an identifier included in the request. In some embodiments, the connection identifier is dynamically determined, for example by using a table, a database, a service, a resource indicator and/or other dynamically changing/updated information. In some embodiments, if an appropriate connection identifier cannot be determined, the process ends and an error message is provided. In some embodiments, the connection identifier is associated with a logical connection of a multiplexed connection.

At 506, a connection request is sent using the determined connection identifier. In some embodiments, the connection request is sent via the received connection in 404 of FIG. 4. In some embodiments, the connection request is sent using a connection separate from the received connection in 404 of FIG. 4. For example, a separate control connection is established between the internal gateway and the perimeter gateway and the control connection is utilized to communicate information required to establish, manage, and/or disconnect one or more connections utilized to access an internal server. In some embodiments, the connection request sent in 506 is received at 206 of FIG. 2 and/or 302 of FIG. 3. In some embodiments, the connection request includes the determined connection identifier. In some embodiments, the connection request includes an identifier of a desired internal server and/or a desired data/service of an internal server.

At 508, an acceptance of the connection request is received and processed. In some embodiments, the received acceptance is the acceptance sent in 308 of FIG. 3. In some embodiments, once the connection request is accepted, a connection with the requestor of the request is bound to a reverse proxy connection with the appropriate internal gateway. In some embodiments, processing the acceptance includes associating together a connection with the requestor of the request with a connection to the appropriate internal gateway. In some embodiments, processing the acceptance includes associating together a connection of the requestor of the request with a logical connection of a multiplexed connection. In some embodiments, processing the connection request includes proxying communication between the connection with the requestor and the connection with the internal gateway. In some embodiments, processing the acceptance includes providing an acceptance notification to a requestor of the request that the request is successful and the desired data/service may be utilized. In some embodiments, in the event the connection request is not accepted, the connection request is reattempted after a predetermined amount of time (e.g., a back-off period). In some embodiments, in the event connection requests have not been accepted after a predetermined number of attempts, the process ends and an error message is provided.

At 510, a new connection with an internal gateway is facilitated. In some embodiments, facilitating the new connection includes receiving a connection provided in 310 of FIG. 3, and performing at least a portion of the process of FIG. 4. In some embodiments, the configuration information associated with the new connection may be preconfigured and/or received from an internal gateway. In some embodiments, at 510, a single new connection is facilitated after a previously received connection has been bound. In some embodiments, a plurality of new connections is facilitated at the same time. For example, an identifier associated with a number of pending connections to be bound is provided to an internal gateway to initiate a number of new connections based on the number of pending connections substantially at the same time. In some embodiments, facilitating the connection includes facilitating a new logical connection of a multiplexed connection between an internal gateway and a perimeter gateway. In some embodiments, facilitating the connection includes redirecting the connection to another server (e.g., another node of cluster 111). For example, based on a load balancing factor, the connection may be redirected to another redundant network node to distribute processing and/or network connections across a cluster of redundant load balanced nodes.

Figure 6:
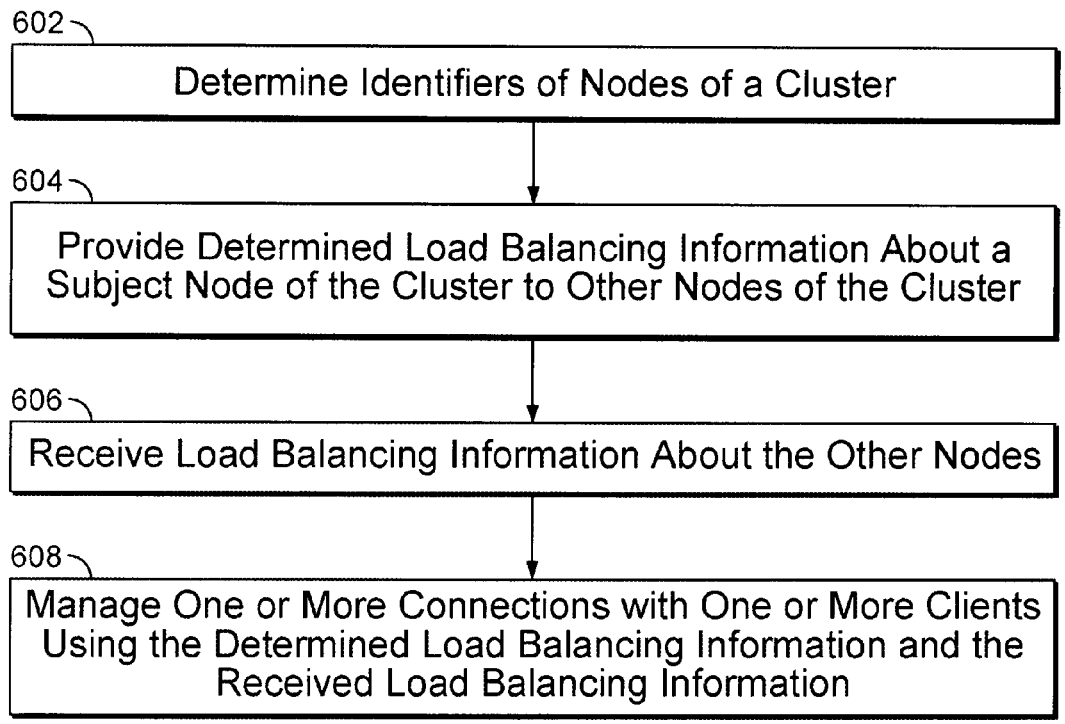
FIG. 6 is a flow chart illustrating an embodiment of a process for processing a connection request.

FIG. 6 is a flow chart illustrating an embodiment of a process for processing a connection request. The process of FIG. 6 may be implemented on perimeter gateway 112 and/or perimeter gateway 113 of FIG. 1A and/or FIG. 1B. In some embodiments, at least a portion of the process of FIG. 6 is included in 406 of FIG. 4, 502 of FIG. 5, and/or 510 of FIG. 5.

At 602, identifiers of nodes of a cluster are determined. In some embodiments, determining the node identifiers includes discovering members of a group of nodes that are configured to redundantly handle connections distributed among the nodes. For example, the nodes of the cluster may be associated with a same network location identifier (e.g., same host/domain identifier that identifies all the nodes of the cluster) and a node of the cluster discovers other nodes that share the same network location identifier. In some embodiments, determining the identifiers of the nodes includes determining a unique network location identifier (e.g., IP address) associated with each of the nodes. For example, nodes of the cluster share the same host identifier (e.g., "gateway.example.com") and the host identifier may be mapped to a plurality of publically reachable IP addresses (e.g., utilizing round-robin DNS) that each identify a different publically accessible node of the cluster. In another example, perimeter gateway 112 discovers that perimeter gateway 113 is part of the same cluster 111 that perimeter gateway 112 belongs to and discovers a publically reachable IP address of perimeter gateway 113 and a publically reachable IP address of itself. The discovered IP address of a second node may be provided by a first node of the cluster to a client connected and/or attempting to connect to the first node to redirect the client to the second node. In some embodiments, instead of utilizing a centralized coordinator that coordinates load balancing among the nodes of the cluster, each node may self-manage load balancing among the nodes of the cluster by redirecting workload/connections to other nodes as needed to maintain load balancing.

At 604, determined load balancing information about a subject node of the cluster is provided to other nodes of the cluster. In some embodiments, providing the load balancing information includes providing an indicator that can be used to determine a load balancing status of the subject node. For example, the subject node determines a performance status of itself that indicates the ability of the subject node to handle a workload or a network connection (e.g., processing required to handle the network connection). In some embodiments, the load balancing information is determined using one or more of the following about the subject node: a processing load, a number of connections being handled, a memory utilization, a storage utilization, a processor utilization, a throughput, a number/percentage of connections at or above a threshold load factor, and any relative (e.g., percentage) and/or absolute measure of a system status. For example, the load balancing information includes a numeric load balancing factor that can be compared with another numeric load balancing factor of another node to determine relative utilization, remaining capacity, and/or a load balancing optimization. In some embodiments, the load balancing information is provided to one or more outer nodes of the cluster, identified in 602. In some embodiments, the load balancing information is delivered to a preconfigured list of nodes that belong to the cluster. In some embodiments, a node of the cluster that is to receive the load balancing information of the subject node may be contacted using a location identifier determined in 602 (e.g., publically reachable IP address) and/or an internal location identifier (e.g., private IP address, etc.) that may be preconfigured and/or dynamically identified. The load balancing information of the subject node may be determined and provided periodically, dynamically, and/or as requested.

At 606, received load balancing information about the other nodes is received. For example, each node of the cluster sends load balancing information about itself to each of the other nodes of the cluster (e.g., sent in 604), and the received load balancing information is received from each of the other nodes of the cluster. In some embodiments, the received load balancing information includes a performance indicator for each of one or more nodes of the cluster that can be used to perform load balancing by the subject node. For example, a relative performance status of each node of the cluster may be determined using the received load balancing information to perform load balancing of network connections being processed by the subject node. In some embodiments, the received load balancing information about each node was determined using one or more of the following associated with respective nodes of the cluster: a processing load, a number of connections being handled, a memory utilization, a storage utilization, a processor utilization, a throughput, a number/percentage of connections at or above a threshold load factor, and any relative (e.g., percentage) and/or absolute measure of a system status. In some embodiments, the load balancing information includes a first numeric load balancing factor of a first node of the cluster that can be compared with a second numeric load balancing factor of a second node of the cluster to determine relative utilization, remaining capacity, and/or a load balancing optimization between the nodes. In some embodiments, the received load balancing information is received from one or more nodes determined in 602. The load balancing information may be received periodically, dynamically, and/or as requested. In some embodiments, an addition of a new node to the cluster may be discovered by another node of the cluster when load balancing information about the new node is received. In some embodiments, a removal and/or offline status (e.g., node down due to error, upgrade, service, etc.) of a node of the cluster may be discovered when load balancing information about the node is not received/updated within a specified time period.

At 608, one or more connections with one or more clients are managed using the determined load balancing information of the subject node and the received load balancing information of other nodes of the cluster. In some embodiments, managing the connection includes redirecting to another node of the cluster a connection (and associated processing/workload) to be handled by the subject node. In some embodiments, managing the connection includes redirecting to another node of the cluster a requested and/or currently handled network connection in the event it is determined that the current node is overloaded. For example, when a new connection is requested from a client to the subject node of the cluster, the subject node checks its determined load balancing information (e.g., determined in 604) to determine whether the subject node is able to effectively handle the new connection. It may be determined that a connection/workload should be redirected to another node in the event a load balancing factor (e.g., determined in 604) is outside a target range and/or above a threshold value (e.g., as compared to load balancing factor(s) of one or more other nodes of the cluster). The target node of the redirect may be determined using the received load balancing information (e.g., received in 606). For example, the node with the lowest load balancing factor is selected as the destination node of a redirection.

Figure 7:
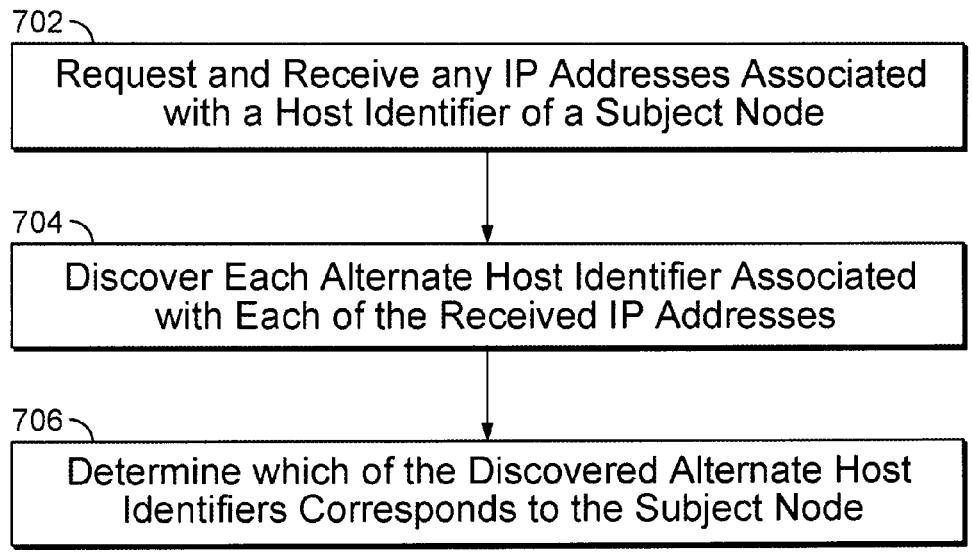
FIG. 7 is a flow chart illustrating an embodiment of a process for discovering a location address of nodes of a cluster.

FIG. 7 is a flow chart illustrating an embodiment of a process for discovering a location address of nodes of a cluster. The process of FIG. 7 may be implemented on perimeter gateway 112 and/or perimeter gateway 113 of FIG. 1A and/or FIG. 1B. For example, each node of cluster 111 performs the process of FIG. 7. In some embodiments, at least a portion of the process of FIG. 7 is included in 406 of FIG. 4, 502 of FIG. 5, and/or 510 of FIG. 5. In some embodiments, at least a portion of the process of FIG. 7 is included in 602 of FIG. 6.

At 702, any IP addresses associated with a host identifier of a subject node is requested and received. For example, a name server (e.g., DNS server) is contacted to lookup one or more IP addresses that map to the host/domain (e.g., cluster host/domain) of the subject node. In some embodiments, determining the nodes includes discovering members of a group of nodes that are configured to redundantly handle network connections distributed among the nodes. For example, the nodes of the cluster may be associated with a same network location identifier (e.g., same host identifier) and a subject node discovers other nodes that share the same network location identifier as the subject node. In some embodiments, one or more nodes of the cluster that are active and eligible to handle connections may be identified by a name server that maps a host/domain identifier of the cluster (e.g., nodes of the cluster share the same host/domain identifier) to the IP address(es) of the one or more active nodes of the cluster. A node may be added and/or removed from the cluster by adding or removing from a DNS server records a publically reachable IP address assigned to the node.

A node of the cluster may be unaware of its public IP address because an internal IP address of the node may be mapped to a publically reachable virtual IP address mapped to the node. In some embodiments, nodes of a cluster are associated with the same host/domain identifier (e.g., "gateway.example.com") and the host/domain identifier may be associated with a plurality of publically reachable IP addresses (e.g., utilizing round-robin DNS) that each map to a different publically accessible node of the cluster. In another example, perimeter gateway 112 discovers that perimeter gateway 113 is part of the same cluster 111 that perimeter gateway 112 belongs to and discovers a publically reachable IP address of perimeter gateway 113 and a publically reachable IP address of itself.

In some embodiments, requesting the IP addresses includes contacting a name server (e.g., DNS server 130 of FIGS. 1A and 1B) and providing a host/domain identifier of the subject node and receiving in response the IP addresses mapped to the host/domain identifier. For example, a cluster is reachable at the host/domain identifier "gateway.example.com" and a DNS server includes the following records.

TABLE 3

Example DNS server records

| Domain | IP address |
| --- | --- |
| gateway.example.com | 54.214.12.188 |
| gateway.example.com | 54.245.102.245 |
| node1.gateway.example.com | 54.214.12.188 |
| node2.gateway.example.com | 54.245.102.245 |
| node3.gateway.example.com | 54.214.12.0 |
| . . . | . . . |

As shown in Table 3, the host identifier "gateway.example.com" is a host identifier of the cluster and maps to both IP address "54.214.12.188" and "54.245.102.245" (e.g., two DNS entries for the host identifier and either IP address can be used to request same content/service). For example, host identifier "gateway.example.com" is a host identifier of cluster 111 of FIGS. 1A and 1B (e.g., all reachable nodes of a cluster have the same public host identifier) and "54.214.12.188" is the publically reachable IP address assigned to gateway 112 and "54.245.102.245" is the publically reachable IP address assigned to gateway 113 of FIGS. 1A and 1B. When a node of the cluster requests an IP address that maps to its identifier "gateway.example.com," the DNS server responds and provides the two IP addresses.

At 704, each alternate host identifier associated with each of the received IP addresses is discovered. For example, each node of the cluster is associated with at least two host identifiers: one host identifier is a host identifier common to reachable nodes of the cluster and an alternate host identifier is a host identifier that is specific to each individual node and maps to only the corresponding node (e.g., a node may be associated with both a cluster host identifier of "gateway.example.com" and a specific node host identifier of "node1.gateway.example.com").

In some embodiments, discovering the alternate host identifiers includes performing a reverse DNS lookup for each of the received IP addresses. For example, each received IP address is provided to a name server (e.g., DNS server 130 of FIGS. 1A and 1B) and the name server provides all the host identifiers that map to each received IP address. The received list of host identifiers from the name server may be filtered/processed to determine the alternate host identifier of a node of the cluster. In some embodiments, a node is preconfigured with a specification of a valid form of the alternate host identifier of the node. For example, the node is preconfigured with a cluster host identifier that maps to a plurality node of the cluster (e.g., host identifier utilized in 702) and a pattern (e.g., string pattern, regular expression, filter, program code, etc.) of a valid alternate host identifier. When in response to the reverse DNS lookup of an IP address, a plurality of host identifiers are received, the host identifier that is not the cluster host identifier and/or matches the valid alternate host identifier pattern may be selected as the alternate host identifier of the node that is mapped to the IP address.

In the example of Table 1, a node has been preconfigured with a cluster host identifier of "gateway.example.com" and an alternate host identifier specific to each node must match the form "*.gateway.example.com" where "*" could be any character(s). In this example, a node that received both "54.214.12.188" and "54.245.102.245" as the IP addresses of the cluster host identifier issues a reverse DNS lookup of "54.214.12.188" and "54.245.102.245." In response to the DNS lookup of "54.214.12.188," the host identifier "gateway.example.com" and "node1.gateway.example.com" are provided. The alternate host identifier for "54.214.12.188" is selected as "node1.gateway.example.com" because it is not the cluster host identifier and matches the preconfigured pattern "*.gateway.example.com." In response to the DNS lookup of "54.245.102.245," the host identifier "gateway.example.com" and "node2.gateway.example.com" are provided and "node2.gateway.example.com" is selected as the alternate host identifier for "54.245.102.245."

The IP addresses associated with the cluster may be dynamically modified by adding, modifying, and/or removing entries of a name server that maps the host identifier of the cluster to the IP addresses. However, changing name server entries may be difficult, inefficient, and/or may take a relatively long time. In some embodiments, in order to reduce amount of name server entry changes, the name server may be prepopulated with one or more placeholder entries that correspond to existing or potential new nodes that are not currently active and each placeholder entry maps an alternate host identifier of the node to its corresponding IP address. For example, in the example of Table 1, a placeholder entry maps "node3.gateway.example.com" to "54.214.12.0" even though this entry will not be utilized until the IP address "54.214.12.0" is mapped to the cluster host identifier (e.g., an entry that maps "gateway.example.com" to "54.214.12.0" is added). In some embodiments, at least a portion of the alternate host identifier is selected using its corresponding IP address. For example, a hash of the IP address is utilized in the host identifier to allow easy translation between the IP address and the host identifier.

At 706, it is determined which of the discovered alternate host identifiers correspond to the subject node. A node of a cluster may be unable to determine which IP address from a plurality of IP addresses received in 702 is the IP address of the node and which corresponding alternate host identifier determined in 704 maps to the node. The subject node may desire to determine its publically reachable IP address and alternate host identifier to allow the subject node to identify which of the discovered IP addresses and corresponding alternate host identifiers belongs to other nodes of the cluster that are potential target nodes of a workload/connection redistribution/redirection. A node may be only preconfigured to know its internal IP address and may be unaware of its public IP address. For example, a node of a cluster may be unaware of its publically reachable IP address because it's publically reachable IP address is a virtual IP address that may be dynamically mapped as needed. In order to discover the specific alternate host identifier that maps to the subject node, the subject node may send a network request (e.g., ping) or redirect a network connection using each of the discovered alternate host identifiers until the request or the redirected connection is received at the subject node. The alternate host identifier that caused the request or redirected connection to be received at the subject node may be identified as the alternative host identifier of the subject node. In some embodiments, a plurality of connection requests/redirects are sent to a plurality of discovered alternate host identifiers in parallel with a corresponding identifier that identifies the alternate host domain used to send the request/redirect and a received request/redirect is analyzed to determine the identifier that identifies the alternate host identifier of the subject node. In some embodiments, the subject node may inform one or more other nodes of its cluster of its discovered alternate host identifier. For example, when the node sends its determined load balancing information to the other nodes of the cluster in 604 of FIG. 6, the node identifies itself using the determined alternate host identifier.

Figure 8:
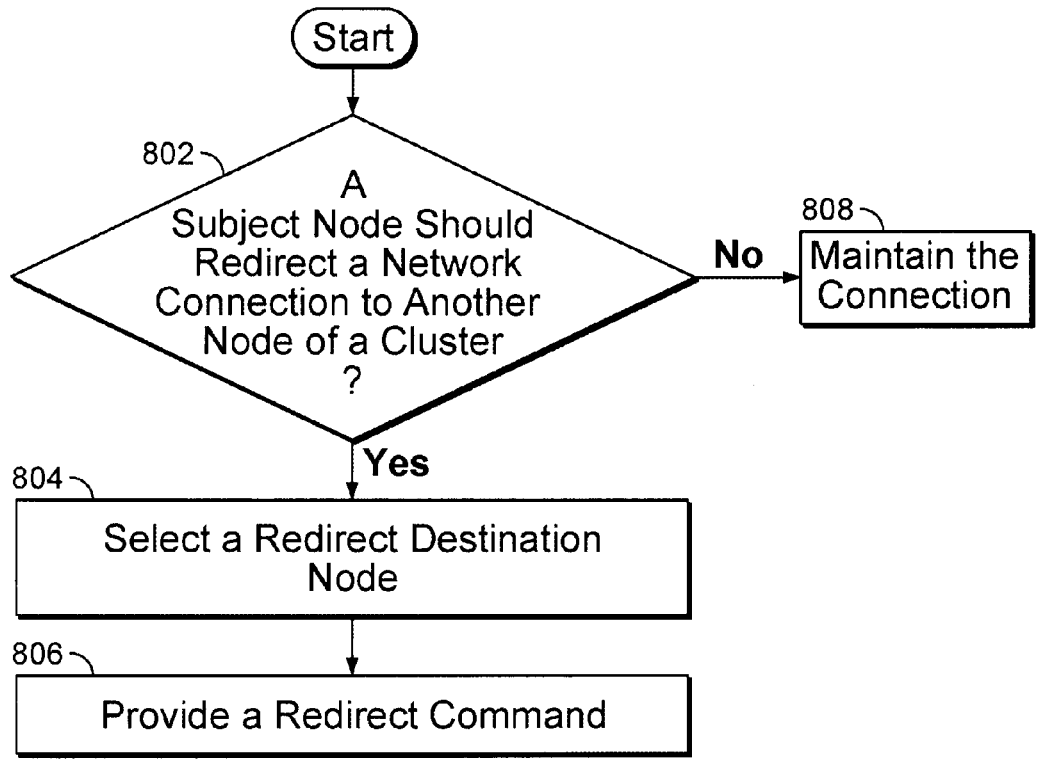
FIG. 8 is a flow chart illustrating an embodiment of a process for redirecting a connection.

FIG. 8 is a flow chart illustrating an embodiment of a process for redirecting a connection. The process of FIG. 8 may be implemented on perimeter gateway 112 and/or perimeter gateway 113 of FIG. 1A and/or FIG. 1B. In some embodiments, at least a portion of the process of FIG. 8 is included in 406 of FIG. 4, 502 of FIG. 5, and/or 510 of FIG. 5. In some embodiments, at least a portion of the process of FIG. 8 is included in 608 of FIG. 6.

At 802, it is determined whether a subject node should redirect a network connection to another node of a cluster. In some embodiments, the subject node is a server that is performing processing related to network connections with one or more clients. For example, the subject node is a WebSocket gateway (e.g., perimeter gateway 112) that is handling WebSocket communication between a client (e.g., requestor 102) and a content server (e.g., internal server 118 via internal gateway 120). In some embodiments, the cluster (e.g., cluster 111, cluster 119, etc.) includes a plurality of nodes that are each able to handle the connection and nodes of the cluster may redirect a connection with a client to another node of the cluster to allow load balancing of connections/workloads between the nodes of the clusters. The determination of 802 may be performed periodically, when a new connection request is received, when a status of the subject node is determined (e.g., determined in 604), when a status of another node of the cluster is received (e.g., received in 606), and/or otherwise dynamically. The connection may be a new connection that is requested to the current node or an existing connection currently handled by the current node. The connection may have been chosen as a candidate for redirection due to its position in an iterative process that analyzes every connection of the current node. In some embodiments, the connection was chosen as a candidate for redirection among connections of the current node due to one or more of the following: an amount of processing resource (e.g., storage, memory, processor, bandwidth, etc.) consumed by the connection, a length of time of the connection, a chronological order of the connection, a client of the connection, and a content/processing requested via the connection.

In some embodiments, determining whether to redirect the connection includes determining whether a performance indicator of the subject node is above a threshold. For example, the performance indicator is the load balancing factor determined in 604 and it is determined whether the load balancing factor at least meets a threshold for redirecting the connection. In some embodiments, determining whether to redirect the connection includes determining whether a performance indicator of the current node is within a range. For example, the performance indicator is the load balancing factor determined in 604 and it is determined to redirect the connection if the load balancing factor is not within a specified range of values.

In some embodiments, determining whether to redirect the connection includes comparing a performance indicator of the current node with one or more performance indicators of one or more other nodes of the cluster. For example, a load balancing factor determined in 604 is compared with one or more load balancing factors received in 606 of FIG. 6. In various embodiments, it is determined to redirect the connection if the performance indicator of the current node as compared to performance indicator(s) of all other node(s)

of the cluster is one of the following: greater, less, at least greater by a threshold difference, or at least less by a threshold difference. For example, it is determined to redirect the connection if a load balancing factor determined in 604 is greater than all other load balancing factors received in 606 by at least the threshold difference.

In some embodiments, the connection may be redirected to place the subject node in an inactive state or remove the subject node from the cluster. For example, the subject node may have encountered an error, is to be serviced, or is to be upgraded. In another example, one or more nodes of the cluster may be underutilized (e.g., as determined using the load balancing factors determined in 604 and received in 606) and it is desired to consolidate connections/workload to fewer nodes and remove the subject node from the cluster.

If at 802 it is determined that the connection should be redirected, at 804 a redirect destination node is selected. In some embodiments, determining the destination node includes selecting a node of the cluster that has enough available resources to effectively receive and handle the connection. In some embodiments, the redirect destination node is selected based at least in part on its performance indicator (e.g., load balancing factor received in 606 of FIG. 6). In various examples, a node of the cluster is selected because its load balancing factor is greater than, less than, or within a range of a threshold. In some embodiments, the redirect destination node is selected based at least in part on its performance indicator as compared to other performance indicators of other nodes of the cluster. For example, a node of the cluster is selected because its load balancing factor is less than (greater than, in an alternative example) all other load balancing factors received in 606 of FIG. 6. The redirect destination node may be selected among nodes of the cluster other than the subject node and confirmed to be in an active state (e.g., confirmed using a load balancing factor received from the node in 606 of FIG. 6).

In some embodiments, a plurality of nodes of a cluster is hosted by a single physical system. For example, the nodes may be virtual servers. It may desirable to host multiple nodes on a physical system to allow migration of a node to another physical system (e.g., migrating an entire node to a new physical system may be easier than adding a new node to a cluster and migrating connections/workload of an overloaded node to the new node). For example, when a physical system hosting multiple nodes becomes overloaded, a node hosted by the physical system may be migrated to another physical system with more available resources. In some embodiments, when a physical system detects that its resource utilization is above a threshold, the physical system automatically initiates a migration of one or more nodes hosted by the physical system to a different physical system.

At 806, a redirect command is provided. In some embodiments, providing the redirect command includes sending an instruction to a client of the connection to redirect the connection to another node of the cluster of the current node. The redirect command may specify the redirect destination node (e.g., provide an alternate host identifier of the destination node discovered in 704 of FIG. 7) selected in 804. In some embodiments, the redirect command may be a WebSocket protocol redirect command negotiated as an extension during a WebSocket upgrade negotiation of the connection (e.g., negotiated using at least a portion of the processes of FIGS. 10, 11, and/or 12). When the redirect command is processed by a receiver of the command, the connection may be terminated and a new connection may be initiated with the redirect destination by the receiver of the command. In some embodiments, the receiver of the command places the connection in an inactive state and places a pre-established (e.g., established previously using at least a portion of the process of FIG. 9) inactive connection with the redirect destination that to an active state, allows the activated pre-established connection to be utilized for active transfer of content/service instead of the inactivated connection.

In some embodiments, an operating system level application (e.g., OS application 134 of FIG. 1C) may not allow connection redirects in an encrypted connection (e.g., HTTPS) and a tunnel redirection may be utilized to achieve the redirect. Server Name Indication extension to the Transport Layer Security protocol and/or Subject Alternative Name Certificate may be utilized to allow a signal security authentication to support multiple nodes and host identifiers of the redirect.

For security reasons, web browsers (e.g., OS app 134 of FIG. 1C) typically restrict an HTTP conversation (e.g., over potentially many HTTP requests) to a destination identified by a particular host identifier (e.g., host identifier mapped to a plurality of IP address using round-robin DNS) to initially choose one of a plurality of the IP addresses (e.g., round-robin DNS) provided by a DNS server (e.g., provided in response to resolve the host identifier) and utilize the chosen IP addresses for the particular host identifier until the browser is closed—this is often known as DNS pinning Therefore, often a browser cannot be forced to choose a specific IP address for a particular host identifier, or instructed to choose a different specific IP address for the same host identifier after the initial request. This may require the use of an alternate host identifier (e.g., discovered at 704 of FIG. 7) when redirecting a connection to a different node of a cluster.

However, the client of the connection may not utilize DNS pining. In some embodiments, the client of the connection is a client that is able to access a list of plurality of IP address that maps to a host identifier of a cluster. For example, the client of the connection owns the HTTP stack on the client side of a WebSocket handshake (e.g., client is not utilizing a traditional web browser to access the connection or the client is another server such as WebSocket gateway) and can therefore advertise the ability to switch to a different IP address for the same host identifier. In an example gateway-to-gateway connection or an example scenario where a client has full control over the HTTP stack, the client can advertise the its ability to follow an HTTP redirect to a different IP address for the same host identifier, and if the server (e.g., WebSocket gateway) recognizes the client's capability, that server is able to directly instruct the client to redirect to another IP address of the same host identifier in 806. This may allow connection redirection without requiring the use of alternate host identifiers (e.g., discovered using the process of FIG. 7). In some embodiments, when connectivity is reversed between a client and a server, the concept of naming the possible paths forwards using unique identifiers may be necessary, as host identifier/IP address choices may not be available.

In some embodiments, client is restricted from being allowed to redirect the connection to an IP address that is not in the set of IP addresses resolved for a particular host identifier by the client. The client may learn unique identifiers (e.g., IP address) as each connection to a node of a cluster is established and the client may be instructed to redirect to another node of the cluster by including or excluding identifiers (e.g., IP addresses) from a set of possible redirection destination nodes of the connection (e.g., include or exclude IP address from IP addresses that resolve to the host identifier of the connection and the client is able to choose a redirect destination from the resulting one or more IP addresses). For example, a HTTP 302 self-redirect is issued using the same host identifier at the HTTP layer with additional headers that guide the client to choose a different IP address for the same host identifier while processing the HTTP redirect.

In an example, a client of the connection may advertise (e.g., using a request header) that it prefers connection redirects over the transport rather than using an alternate host identifier. In this example, the client may provide an identifier indicating a number of IP address choices the client had when choosing to connect using a particular host identifier, and the client may also provide an identification of the IP address selected (e.g., hash of the chosen IP address) for the host identifier. When the redirect command in 806 is desired to be sent in this example, the redirect command may specify either a list of one or more IP addresses (e.g., hashed IP addresses) to exclude from the IP addresses that map to the particular host identifier or a list of one or more IP address (e.g., hashed IP addresses) from the IP addresses that map to the particular host identifier, as candidates the client may select as the redirect destination. For example, the particular host identifier resolves to three IP addresses and redirect destination option(s) (e.g., client selects if more than one resulting IP addresses) may be specified as one or more specified IP addresses of the three IP addresses or any of the three IP addresses except one or more specified IP addresses.

If at 802 it is determined that the connection should not be redirected, at 808 the connection is maintained. For example, connection remains at the subject for processing/handling (e.g., proxying or providing a requested content/service).

Figure 9:
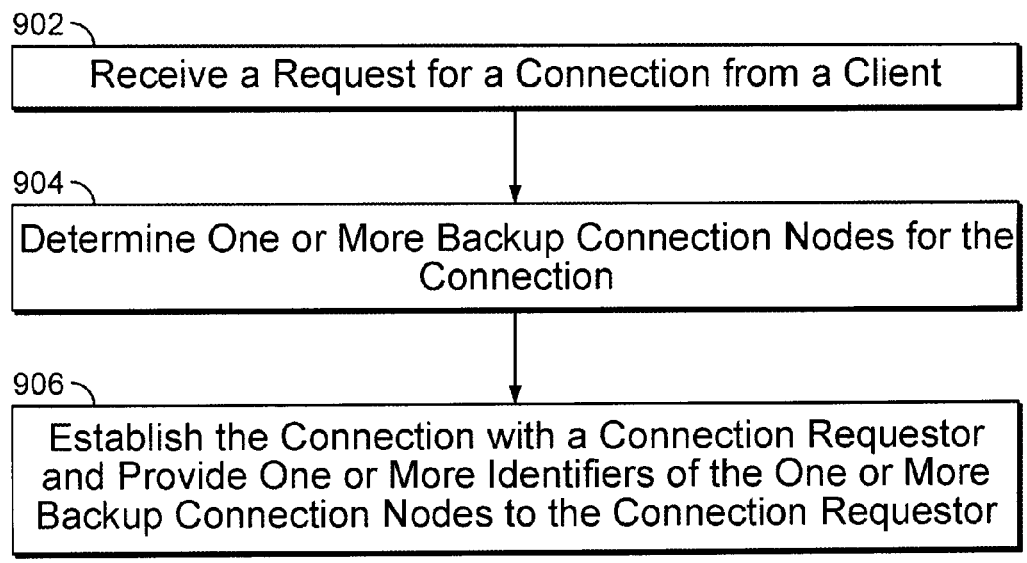
FIG. 9 is a flow chart illustrating an embodiment of a process for informing a client of a backup connection.

FIG. 9 is a flow chart illustrating an embodiment of a process for informing a client of a backup connection. The process of FIG. 9 may be implemented on perimeter gateway 112 and/or perimeter gateway 113 of FIG. 1A and/or FIG. 1B. In some embodiments, at least a portion of the process of FIG. 9 is included in 404 of FIG. 4, 502 of FIG. 5, and/or 510 of FIG. 5. In some embodiments, at least a portion of the process of FIG. 9 is included in 608 of FIG. 6.

At 902, a request for a connection is received from a client. Examples of the client include requestor 102 and requestor 110 of FIGS. 1A and 1B, and client 132 of FIG. 1C. In some embodiments, the request is initiated by web application 136 via OS application 134 of FIG. 1C. Web application 136 may be unable to view all IP addresses associated with a host identifier of a cluster requested by web application 136. For example, web application 136 requests content at a server with a specified host identifier and OS application 134 (e.g., web browser) requests and receives a plurality of IP addresses associated with the specified host identifier but only exposes a selected one of the received IP addresses. Thus web application 136 is not aware of other nodes of a cluster reachable using the same requested host identifier. If the client of web application 136 desires to establish a plurality of simultaneous connections with a plurality of nodes identified by the same host identifier, the client must be provided an alternate host identifier for each of the plurality of nodes.

In some embodiments, the request includes a request to establish a connection with a server (e.g., node of a cluster) that will provide a requested content/service. For example, the request includes a host identifier associated with a plurality of nodes of a cluster. In some embodiments, the request includes a request to establish a WebSocket connection. For example, a request to upgrade an HTTP/HTTPS connection to a WebSocket connection is received. In some embodiments, the request is the request received at 406 of FIG. 4. In some embodiments, the request is received from a requestor such as requestor 102 (e.g., via connection 122 or connection 142) and/or requestor 110 (e.g., via connection 124 or connection 144) at perimeter gateway 112 to access internal server 118 of FIG. 1A and/or 1B.

At 904, one or more backup connection nodes for the connection are determined. For example, a client is to establish a plurality of connections with a plurality of nodes of a cluster (e.g., cluster 111) and utilize only one of the connections as the active connection while other connection(s) are backup connection(s). In the event the node of the active connection becomes unavailable, the active connection is unavailable (e.g., due to connection error), or the active connection is to be redirected (e.g., redirect command received from 806 of FIG. 8), the node may be able to switch to a different node of the cluster by utilizing one of the backup connections as a new active connection rather than initiating a new connection as the new active connection. This may speed up redirects and error recovery. In some embodiments, determining the backup connection nodes includes determining identifier(s) of other available nodes of the cluster that may be utilized by the client to initiate a connection with each of the backup connection node(s). In some embodiments, determining the backup connection nodes includes selecting one or more of the alternate host identifiers discovered in 704 of FIG. 7 as identifier(s) of the one or more backup connection nodes to be provided to a client. For example, requestor 102 requests a connection with perimeter gateway 112 and perimeter gateway 112 provides to requestor 102 alternate host identifiers of all other nodes of its cluster (e.g., alternate host identifier of perimeter gateway 113) and requestor 102 requests a backup connection using the alternate host identifiers (e.g., requests a backup connection with perimeter gateway 113). In some embodiments, the one or more backup connection nodes are all publically available nodes of the cluster other than the subject node that initially received the connection request. In some embodiments, the one or more backup connection nodes are selected from a subset of all publically available nodes of the cluster other than the current node. For example, one or more backup connection nodes are selected from nodes that provided a load balancing factor in 606 of FIG. 6 and selected based at least in part on the provided load balancing factor (e.g., one or more nodes with the lowest load balancing factor scores are selected).

At 906, the connection is established with a connection requestor and one or more identifiers of the one or more backup connection nodes are provided to the connection requestor. Establishing the connection may include accepting the connection request. In some embodiments, providing the one or more identifiers includes providing one or more alternate host identifiers discovered in 704 of FIG. 7 that correspond to the one or more backup connection nodes. In some embodiments, establishing the connection includes establishing a WebSocket connection with the connection requestor. In some embodiments, establishing the connection includes binding the connection with an appropriate internal gateway to service the request. In some embodiments, the connection may be redirected to another server (e.g., another node of cluster 111). For example, based on a load balancing factor, the connection may be redirected to one of the backup connection nodes determined in 904 (e.g., client of the connection utilizes a pre-established backup connection with the backup connection node instead of the redirected connection).

Figure 10:
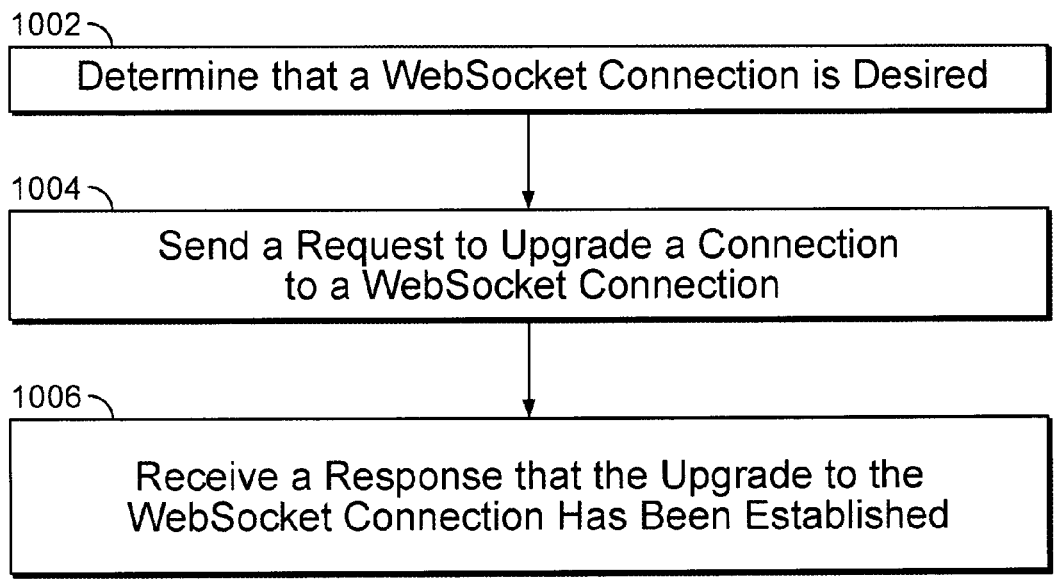
FIG. 10 is a flowchart illustrating an embodiment of a process for requesting a WebSocket connection.

FIG. 10 is a flowchart illustrating an embodiment of a process for requesting a WebSocket connection. The process of FIG. 10 may be implemented on one or more components of requestor 102 and/or requestor 110 of FIGS. 1A and 1B, and/or client 132 of FIG. 1C.

At 1002, it is determined that a WebSocket connection is desired. In some embodiments, determining that the WebSocket connection is desired includes receiving a request (e.g., from an application such as web application 136 of FIG. 1C) that a WebSocket connection is desired. In some embodiments, determining that the WebSocket connection is desired includes detecting that a WebSocket connection is desired. In some embodiments, determining that the WebSocket connection is desired is associated with visiting a website, launching an application, and/or a request to obtain content available via a WebSocket connection. The determination that a WebSocket connection is desired may be associated with an existing HTTP/HTTPS connection that is to be upgraded to a WebSocket connection. In some embodiments, the determination that a WebSocket connection is desired is made by an operating system level application such as OS application 134 of FIG. 1C. For example, a web application running on a web browser signals to the web browser that an HTTP/HTTPS connection is to be upgraded to a WebSocket connection. In another example, when an application such as a mobile application is launched, an HTTP/HTTPS connection to a server is initialized and it is determined that the HTTP/HTTPS connection is to be upgraded to a WebSocket connection.

At 1004, a request to upgrade a connection to a WebSocket connection is sent. The request may be sent to a server of the connection such as perimeter gateway 112, perimeter gateway 113 of FIGS. 1A and 1B, or any other server able to handle WebSocket connections. In some embodiments, sending the request includes initializing a WebSocket handshake to upgrade the connection. The connection may be an already established HTTP/HTTPS connection and/or a new HTTP/HTTPS connection established in response to the determination made at 1002. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the request to update the connection is managed by an operating system level application such as OS application 134 of FIG. 1C. In some embodiments, sending the request includes initializing an opening handshake as specified in the WebSocket standard. In some embodiments, the request includes identification of one or more capabilities of a client that are not directly specified in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request to utilize a control message regarding a specified extended capability not directly implemented by the WebSocket protocol standard. In some embodiments, the request to initialize the control message includes one or more configurations associated with utilizing the control message.

An example of an extended functionality includes the ability to redirect a WebSocket connection. The WebSocket protocol, as currently standardized, does not support connection redirection. For example, a response to an HTTP request to upgrade a connection to a WebSocket connection cannot include a 300 level HTTP response code that specifies that the connection request should be redirected to another location. It also may be desirable to be able to send a redirect request after a WebSocket connection has been established. For example, the connection may be redirected to redistribute connections and associated workloads across a group of servers (e.g., among nodes of a cluster such as cluster 111 of FIGS. 1A and 1B).

In an example, the request to upgrade the connection includes the following: "Sec-WebSocket-Extension: x-kaazing-http-balance; redirect=302." This specifies that the client desires support of a WebSocket extension named "x-kaazing-http-balance" that, if supported, allows a server to provide a redirect instruction (e.g., either during WebSocket handshake or mid connection after WebSocket connection has been established). Additionally, "redirect=302" is a parameter of the "x-kaazing-http-balance" WebSocket extension and specifies a type of redirect accepted by the client. For example, "302" is analogous to an HTTP response code 302 and allows the server to provide an HTTP 302 response message (including a redirect destination location) in response to the WebSocket upgrade request. In another example if "redirect=300" parameter is specified, "300" is analogous to an HTTP response code 300 and allows the server to provide an HTTP 300 response message (including a plurality of alternative redirect destination locations/URI) in response to the WebSocket upgrade request. If no parameter is specified for the "x-kaazing-http-balance" WebSocket extension, the default type of redirect accepted by the client is an HTTP 300 response.

In response to the request that specifies an extension supporting WebSocket redirect, a server may provide a redirect response. For example, the server provides an HTTP 302 response specifying a redirect destination location address (e.g., URI). Then in this example, the client initiates a connection with the destination location address, and the process returns to 1004 where the newly initiated connection is requested to be upgraded to a WebSocket connection supporting the WebSocket redirect extension. In another example, the server provides an HTTP 300 response specifying a plurality of redirect destination location addresses (e.g., URIs). Then in this example, the client attempts to sequentially initiate a connection with each of the destination location addresses until a valid connection is established, and the process returns to 1004 where the newly initiated connection is requested to be upgraded to a WebSocket connection supporting the WebSocket redirect extension.

At 1006, a response that the upgrade to the WebSocket connection has been established is received. The response may be sent to a client by a server such as perimeter gateway 112, perimeter gateway 113 of FIGS. 1A and 1B, or any other server able to handle WebSocket connections. In some embodiments, receiving the response includes receiving a response to a WebSocket handshake upgrade request sent in 1004. In some embodiments, the request to update the connection is received by an operating system level application such as OS application 134 of FIG. 1C and the operating system level application informs a hosted application such as web application 136 that the WebSocket connection has been established. In some embodiments, receiving the response includes completing an opening handshake as defined in the WebSocket standard. In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence. An example response specifies that a WebSocket redirect extension is supported and that a specified control byte sequence may be utilized to identify a redirect command provided via the WebSocket connection.

Figure 11:
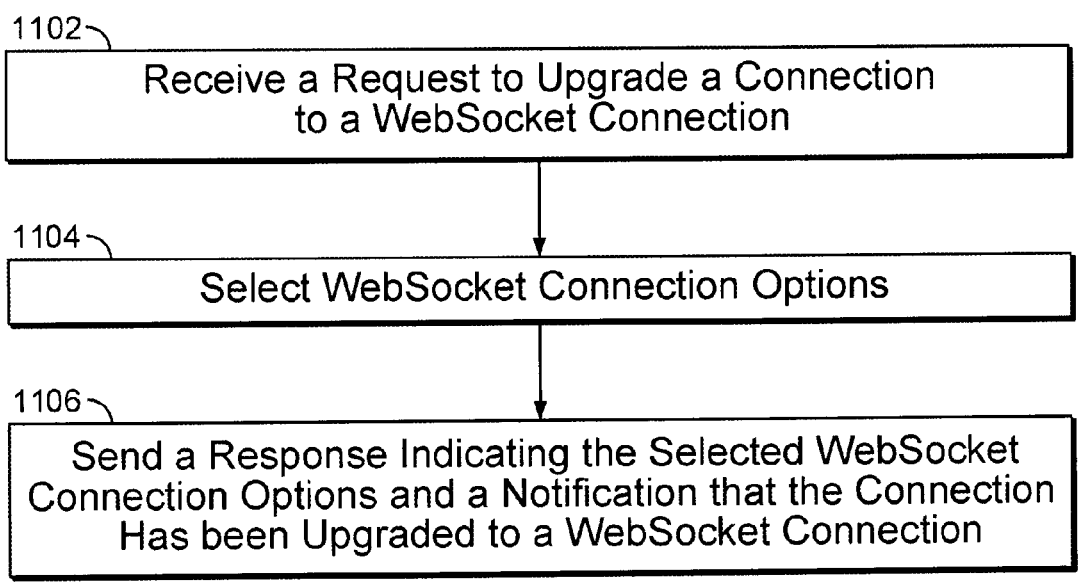
FIG. 11 is a flowchart illustrating an embodiment of a process for confirming a request to establish a WebSocket connection.

FIG. 11 is a flowchart illustrating an embodiment of a process for confirming a request to establish a WebSocket connection. The process of FIG. 11 may be implemented on one or more components of perimeter gateway 112, perimeter gateway 113, internal gateway 120, and/or internal gateway 121 of FIGS. 1A and/or 1B, and any other server configured to handle WebSocket connections. In some embodiments, at least a portion of the process of FIG. 11 is included in 302 of FIG. 3, 406 of FIG. 4, 608 of FIG. 6 and/or 902 of FIG. 9.

At 1102, a request to upgrade a connection to a WebSocket connection is received. In some embodiments, the request is associated with visiting a website, launching an application, and/or a request to obtain content available via a WebSocket connection. In some embodiments, the request was made by an operating system level application such as OS application 134 of FIG. 1C. For example, a web browser has made the request in response to a web application running on the web browser that has requested the WebSocket connection. In another example, when an application such as a mobile application is launched, an HTTP/HTTPS connection to a server for the mobile application is initialized and a request to upgrade the HTTP/HTTPS connection is sent to the server. In some embodiments, the request received at 1102 includes the request sent at 1004 of FIG. 10.

In some embodiments, the request is associated with initializing a WebSocket handshake to upgrade the connection. The connection may be an already established HTTP/HTTPS connection and/or a new HTTP/HTTPS connection established in response to the determination made at 1002 of FIG. 10. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the received request initializes an opening handshake as described in the WebSocket standard. In some embodiments, the request includes identification of one or more capabilities of a client that are not directly implemented in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request that utilizes a control message regarding a specified extended capability not directly implemented by the WebSocket protocol standard. In some embodiments, the request to initialize the control message includes one or more configurations associated with utilizing the control message. In some embodiments, the configuration of the control message includes a configuration specifying which one or more communication parties is allowed to utilize the control message. For example, only a client side communication party, not a server-side communication party, of a WebSocket connection is configured to utilize a control message that specifies that the connection should be redirected to another location. In some embodiments, different control messages may be associated with different configurations of allowed communication parties that are allowed to utilize the control message.

An example of the extended functionality includes the ability to redirect a WebSocket communication. The WebSocket protocol, as currently standardized, does not support connection redirection. For example, a response to an HTTP request to upgrade a connection to a WebSocket connection cannot include a 300 level HTTP response code that specifies that the connection request should be redirected to another location. It also may be desirable to be able to send a redirected request after a WebSocket connection has been established. For example, the connection may be redirected to redistribute connections and associated workloads to another node of a cluster of servers (e.g., redistributed among nodes of cluster 111 of FIGS. 1A and 1B).

In an example, the request to upgrade the connection includes the following: "Sec-WebSocket-Extension: x-kaazing-http-balance; redirect=302." This specifies that the client desires support of a WebSocket extension named "x-kaazing-http-balance" that, if supported, allows a server to provide a redirect instruction (e.g., either during WebSocket handshake or mid connection after WebSocket connection has been established). Additionally, "redirect=302" is a parameter of the "x-kaazing-http-balance" WebSocket extension and specifies a type of redirect accepted by the client. For example, "302" is analogous to an HTTP response code 302 and allows the server to provide an HTTP 302 response message (including a redirect destination location) in response to the WebSocket upgrade request. In another example if "redirect=300" parameter is specified, "300" is analogous to an HTTP response code 300 and allows the server to provide an HTTP 300 response message (including a plurality of alternative redirection destination locations/URIs) in response to the WebSocket upgrade request. If no parameter is specified for the "x-kaazing-http-balance" WebSocket extension, the default type of redirect accepted by the client is an HTTP 300 response.

At 1104, WebSocket connection options are selected. In some embodiments, selecting the WebSocket connection options include configuring the WebSocket connection and/or options associated with the WebSocket connection. In some embodiments, selecting the WebSocket connection options includes determining which one or more of the provided configuration options provided in the request received at 1102 should be supported. For example, the received request includes a plurality of possible configuration options and only one of the options is to be selected by the receiver of the request. In some cases, the receiver may be able to select a plurality of options from the plurality of configuration options. In some embodiments, selecting the WebSocket connection option includes determining whether a configuration option in a received request is supported by the receiver of the request. For example, the request received at 1102 includes an identifier of an extended capability of the WebSocket protocol and it is determined whether the receiver of the request supports the extended capability. In some embodiments, selecting the WebSocket connection option includes configuring a control message. For example, a control byte sequence to be utilized to signal a control message associated with a specified extended capability is determined.

In some embodiments, in response to the upgrade request, a redirect instruction may be provided. For example, an HTTP 302 response is provided specifying a redirect destination location address (e.g., URI), and the process of FIG. 11 ends. In another example, an HTTP 300 response is provided specifying a plurality of redirect destination location addresses (e.g., URIs), and the process of FIG. 11 ends. The determination of whether to provide a redirect instruction may be determined using at least a portion of the process of FIG. 8.

At 1106, a response indicating the selected WebSocket connection options and a notification that the connection has been upgraded to a WebSocket connection are sent. The response may be sent to a client by a server (e.g., sent by perimeter gateway 112, perimeter gateway 113, internal gateway 120, or internal gateway 121 of FIGS. 1A and 1B, or any other server configured to handle WebSocket connections). In some embodiments, sending the response includes sending a response to a WebSocket handshake upgrade request received in 1102. In some embodiments, sending the response includes completing an opening handshake as defined in the WebSocket standard.

In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence. An example response specifies that a WebSocket redirect extension is supported and that a specified control byte sequence may be utilized to identify a redirect command.

Figure 12:
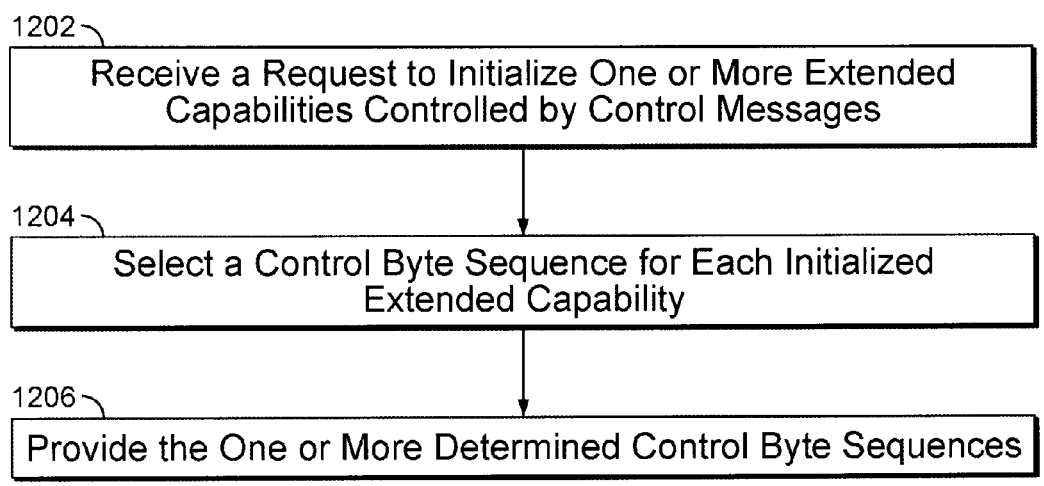
FIG. 12 is a flow chart illustrating an embodiment of a process for providing a control byte sequence.

FIG. 12 is a flow chart illustrating an embodiment of a process for providing a control byte sequence. The process of FIG. 12 may be implemented on one or more components of perimeter gateway 112, perimeter gateway 113, internal gateway 120, and/or internal gateway 121 of FIGS. 1A and/or 1B, or any other server configured to handle WebSocket connections. In some embodiments, at least a portion of the process of FIG. 12 is included in step 1102 and/or 1104 of FIG. 11.

At 1202, a request to initialize one or more extended capabilities controlled by control messages is received. In some embodiments, the request to initialize the extended capabilities was included in the request sent in 1004 of FIG. 10. In some embodiments, the request to initialize the controlled extended capabilities was included in the request received in 1102 of FIG. 11. In some embodiments, the request to initialize the controlled extended capabilities is received as a request outside of the WebSocket upgrade handshake process. For example, the request is received after a WebSocket connection has been already established. In some embodiments, the request includes an identification of one or more capabilities that are not directly specified in the WebSocket protocol standard. For example, the request includes an identifier of an extended capability of the WebSocket protocol that is supported by a client sending the request. In some embodiments, the request includes a request to initialize the utilization of one or more control messages regarding one or more specified extended capabilities not directly implemented by the WebSocket protocol standard. In some embodiments, the request includes one or more configuration parameters associated with the control messages.

At 1204, a control byte sequence is selected for each initialized extended capability. In some embodiments, the request received at 1202 includes an identifier for each identified extended capability. For each of these identifiers, it is determined whether the associated extended capability is supported. For example, if the extended capability is supported, a control byte sequence for the extended capability is determined. In some embodiments, selecting a control byte sequence includes selecting a unique identifier that can be used by a WebSocket communication sender to identify that a control message for a specified extended capability is included in a WebSocket frame. For example, the control byte sequence may be included in a payload data portion of a WebSocket frame to identify that contents of the frame include a control message (e.g., a message specifying that the connection should be redirected to a specified location address) that is to be processed in a different manner as compared to a normal WebSocket frame (e.g., containing end application level data) that does not include the control message. The control byte sequence may be specifically assigned to a specific extended capability. For example, a different control byte sequence exists for each different extended capability that is supported. In some embodiments, an extended capability may be selectively controlled using the control byte sequence. For example, a specified extended capability may be configured by sending a WebSocket frame that includes the control byte sequence and a control message. In another example, a specified extended capability may be selectively activated and deactivated at least in part by sending a WebSocket frame that includes the control byte sequence and a control message.

In some embodiments, the control byte sequence is a predetermined length. For example, all control byte sequences contain the same number of bits (e.g., 4 bytes) to enable efficient identification of a control byte sequence within a WebSocket frame. In some embodiments, determining the control byte sequence includes selecting a binary number. The control byte sequence may be at least in part randomly determined, selected from a list of possible options, sequentially selected, and/or dynamically generated.

In some embodiments, the control byte sequence is determined such that the bits of control byte sequence contain the maximum number of overlapping bits with the bits of one or more other control byte sequences. For example, if all of the different control byte sequences contain the maximum number of same overlapping bits, an efficient determination of whether a WebSocket frame includes any type of control byte sequence may be made by determining whether the WebSocket frame includes the bits of the overlapping bits. If the WebSocket frame does not include the bits of the overlapping bits (e.g., in the beginning of the payload data portion of the WebSocket frame), a determination may be made that the WebSocket frame does not include any control byte sequence from a group of possible control byte sequences without making a separate determination for each control byte sequence from the group. If the WebSocket frame does include the bits of the overlapping bits (e.g., in the beginning of the payload data portion of the Web Socket frame), additional processing may be performed to determine which control byte sequence, if any, from a group of possible control byte sequences is included in the WebSocket frame. An example of selecting bits of a control byte sequence that contain the maximum number of overlapping bits with the bits of one or more other control byte sequences includes selecting as the control byte sequence an available binary number representation that is sequentially adjacent to a binary number representation of one of the preexisting control byte sequences.

In some embodiments, the control byte sequence is selected based at least in part on a protocol and/or an encoding scheme associated with a WebSocket connection. In some embodiments, a control byte sequence is selected such that the control byte sequence is unlikely to occur in a normal communication utilizing the protocol and/or an encoding scheme because the control byte sequence violates a specification of the protocol and/or encoding scheme. For example, a communication of a WebSocket connection may be utilizing a UTF-8 encoding scheme (i.e., a variable length encoding scheme used to represent characters). In the UTF-8 specification, representing a character using 21 bits requires the bits to be encoded into 4 bytes. The 4 bytes are "11110xxx", "10xxxxxx", "10xxxxxx" and "10xxxxxx" where "x" represents a place where each bit of the 21 bits can be placed. When the first byte (i.e., "11110xxx") is received by a receiver, the receiver expects the subsequent 3 bytes to begin with "10" in a correct UTF-8 encoding. However, by selecting a 4 byte control byte sequence that begins with "11110xxx" but where subsequent bytes of the sequence do not all begin with "10," the selected control byte sequence cannot occur in a valid UTF-8 encoded WebSocket communication. By minimizing the likelihood that the control byte sequence is likely to occur in normal WebSocket communication, processing required to handle situations when non-control data sent in a WebSocket frame happens to include a control byte sequence (potentially causing the WebSocket frame to be incorrectly interpreted as including a control message) may be minimized.

At 1206, the one or more determined control byte sequences are provided. In some embodiments, step 1206 is included in step 1106 of FIG. 11. In some embodiments, the provided control byte sequence is received in step 1006 of FIG. 10. For example, a control byte sequence is provided together with a response indicating a successful upgrade of a connection to a WebSocket connection. One or more of the control byte sequences may be provided as a hexadecimal number. For example, an identifier of an extended capability that will be supported by an established WebSocket connection is provided with an associated hexadecimal control byte sequence that can be used to send a control message associated with the extended capability. An example WebSocket extension negotiation response specifies that a WebSocket redirect extension is supported and that the determined control byte sequence may be utilized to identify a redirect command.

Figure 13:
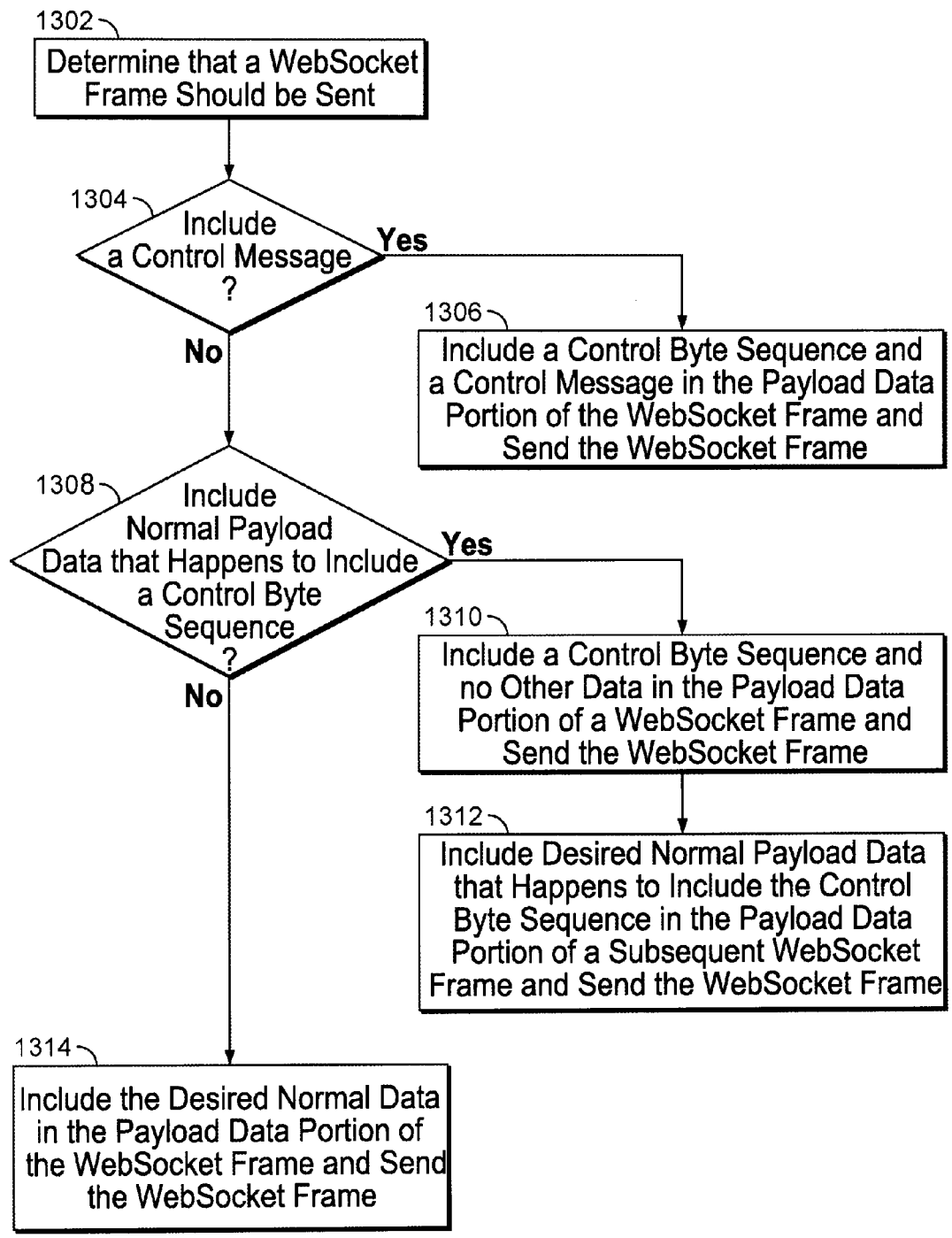
FIG. 13 is a flow chart illustrating an embodiment of a process for sending a WebSocket frame.

FIG. 13 is a flow chart illustrating an embodiment of a process for sending a WebSocket frame. The process of FIG. 13 may be implemented on requestor 102, requestor 110, client 132, perimeter gateway 112, perimeter gateway 113, internal gateway 120, and/or internal gateway 121 of FIGS. 1A, 1B, and/or 1C.

At 1302, it is determined that a WebSocket frame should be sent. Determining that a WebSocket frame should be sent may be associated with preparing a WebSocket frame to be sent. If at 1304 it is determined that the WebSocket frame to be sent should include a control message, at 1306, a control byte sequence and a control message are included in the payload data portion of the WebSocket frame and the frame is sent. The frame may be included in a group of frames before being sent. The control byte sequence is associated with the extended functionality to be controlled using the control message. In some embodiments, the control byte sequence is a control byte sequence determined at step 1204 of FIG. 12. The control byte sequence, if present in a WebSocket frame, may be required to be placed within the same relative position within a payload portion of a WebSocket frame. For example, a control byte sequence, if present, is always placed in the beginning of the payload data portion of a WebSocket frame. The control message may include data that specifies a configuration parameter, metadata, and/or a data to be processed by the identified extended functionality. In some embodiments, the control message is managed, created, and/or processed at a processing level above an end destination application. For example, the control message is processed by a web browser above the processing level of a web application executing within the web browser. In this example, although normal payload contents of a WebSocket frame are forwarded to the web application, the web application is unaware of control messages in the payload of a WebSocket frame.

In some embodiments, if a WebSocket frame includes a control message, the WebSocket frame is required to include one or more specific data in a metadata portion (e.g., an opcode portion) of the WebSocket frame. For example, according to the WebSocket standard, all WebSocket frames must include a 4 bit opcode that specifies how to interpret the payload portion of the WebSocket frame. In some embodiments, if a WebSocket frame includes a control message, the WebSocket frame is required to include an opcode for a "binary frame" (i.e., hex "%x2"). In this case, a receiver of a WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on that WebSocket frame.

An example of a control message includes a message to redirect a WebSocket connection to a different host. For example, a network node handling the WebSocket connection may determine that a different network node should handle the WebSocket connection due to load balancing factors and/or place the node in an inactive state. The determination of whether to send the redirect control message may be determined using at least a portion of the processes of FIGS. 6 and/or 8. The control message may specify one or more destination location addresses (e.g., host(s)) of the redirect. In some embodiments, the destination location addresses are determined using at least a portion of the processes of FIGS. 6, 7, and/or 8 (e.g., one or more of alternate hosts/domains discovered in 704 of FIG. 7 is selected in 804 of FIG. 8).

If at 1304 it is determined that the WebSocket frame to be sent should not include a control message, at 1308 it is determined whether normal payload data that happens to include a control byte sequence is being sent. In some embodiments, the normal payload data does not include a control message. For example, the normal payload data is intended for an end destination application such as web application 136 of FIG. 1C. In some embodiments, although bandwidth efficiency is gained by not dedicating a fixed portion of the WebSocket frame to a control byte sequence, there exists a need to address situations when normal non-control data is being sent in the payload data portion of a WebSocket frame but the data desired to be sent happens to include a control byte sequence that might cause the WebSocket frame to be incorrectly interpreted as including a control message. If the normal payload data to be sent happens to include a control byte sequence, at 1310, a WebSocket frame that only includes in its payload data portion the control byte sequence and no other data is sent. This WebSocket frame signals that the subsequent WebSocket frame that includes the control byte sequence should not be interpreted as containing a control message. Then at 1312, the desired non-control data that happens to include the control byte sequence is included in the payload data portion of a subsequent WebSocket frame and the WebSocket frame is sent. This WebSocket frame would be interpreted as not including a control message.

If at 1308 it is determined that normal payload data to be sent in the WebSocket frame does not happen to include a control byte sequence, at 1314, the desired normal payload data is included in the payload data portion of the WebSocket frame and the WebSocket frame is sent. For example, because no special processing is necessary with respect to the interpretation of the payload data of the WebSocket frame, the WebSocket frame may be created and sent normally as defined in the WebSocket standard. In some embodiments, the WebSocket frame may be included in a grouping of WebSocket frames before being sent.

Figure 14:
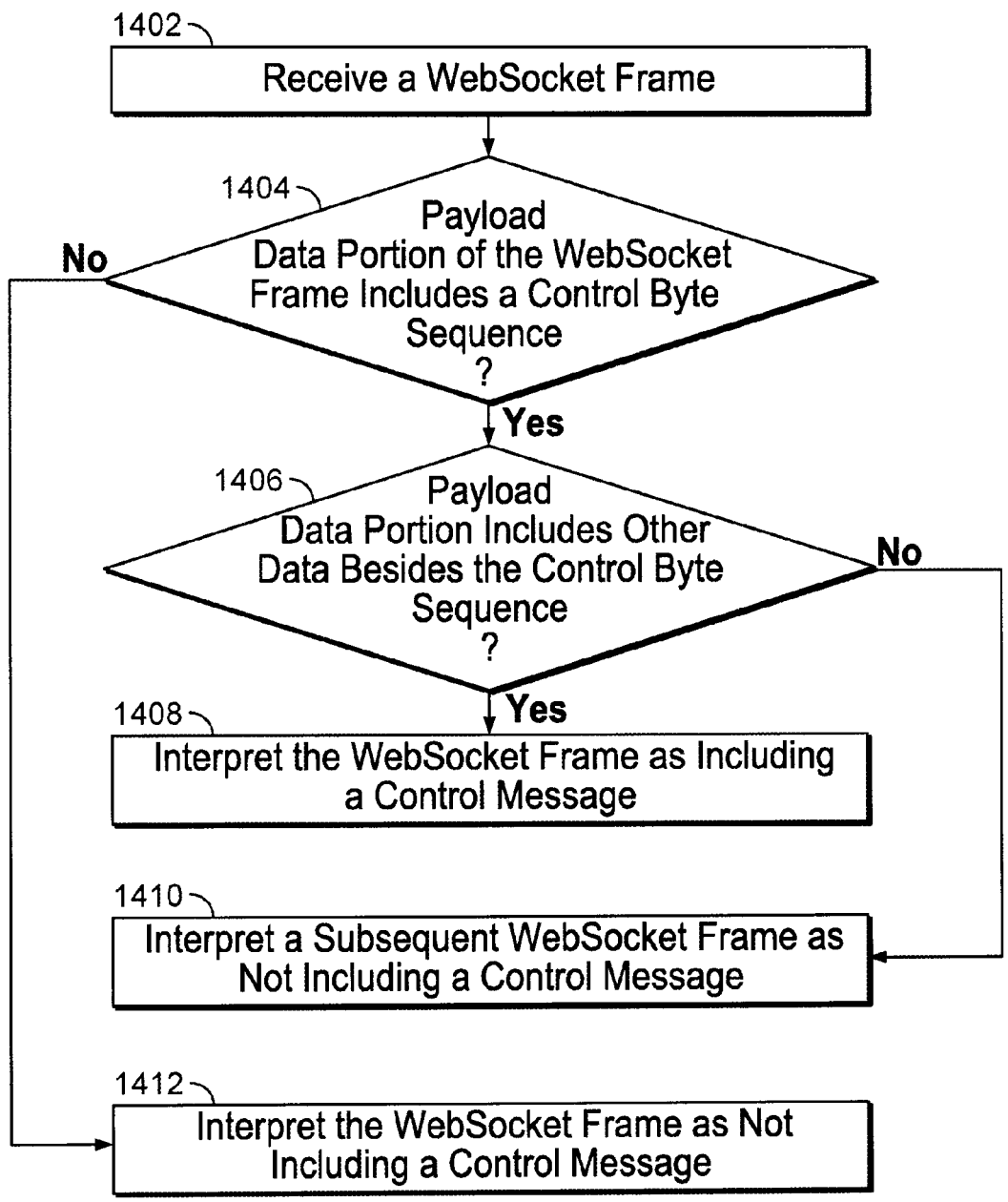
FIG. 14 is a flowchart illustrating an embodiment of a process for receiving a WebSocket frame.

FIG. 14 is a flowchart illustrating an embodiment of a process for receiving a WebSocket frame. The process of FIG. 14 may be implemented on requestor 102, requestor 110, client 132, perimeter gateway 112, perimeter gateway 113, internal gateway 120, and/or internal gateway 121 of FIGS. 1A, 1B, and/or 1C.

At 1402, a WebSocket frame is received. In some embodiments, the received frame includes the WebSocket frame sent at least in part by using the process of FIG. 13. In some embodiments, the received WebSocket frame may be one frame of a group of WebSocket frames received together.

At 1404 it is determined whether the payload data portion of the received WebSocket frame includes a control byte sequence. In some embodiments, the control byte sequence is a control byte sequence determined at 1204 of FIG. 12. The control byte sequence, if present in a WebSocket frame, may be required to be placed within the same relative position as a payload portion of a WebSocket frame. For example, a control byte sequence, if present, is always placed in the beginning of the payload data portion of a WebSocket frame. If at 1404 it is determined that the payload data portion of the received WebSocket frame includes a control byte sequence, at 1406 it is determined whether the payload data portion also includes other data besides the control byte sequence. If the payload data does include other data, at 1408, the received WebSocket frame is interpreted as including a control message. In some embodiments, interpreting the WebSocket frame as including a control message includes determining which extended functionality is associated with the control byte sequence and interpreting the control message based on the determined extended functionality.

In some embodiments, interpreting the WebSocket frame as a control message includes processing the control message included in the payload data portion of the WebSocket frame. This data may specify a configuration parameter, metadata, and/or a data to be otherwise processed. In some embodiments, the control message is managed, created, and/or processed at a processing level above an end destination application. For example, the control message is managed by a web browser above the processing level of a web application executing within the web browser. In this example, although normal payload contents of a WebSocket frame are forwarded to the web application, the web application is unaware of the control messages and is provided the control message. In some embodiments, the WebSocket frame interpreted at 1408 was sent in step 1306 of FIG. 13.

An example of a received control message includes a control message to redirect a WebSocket connection to a different host. The control message may specify one or more destination location addresses (e.g., host(s)) of the redirection. In some embodiments, in response to the redirect control message, a client may initiate a new connection to the host specified in the control message. If a plurality of hosts is specified in the control message, the hosts may be sequentially attempted for a connection until a successful connection is established. The newly initiated connection may be requested to be upgraded to a WebSocket connection using at least a portion of the process of FIG. 10.

If at 1406 it is determined that the payload data portion does not include other data besides the control byte sequence, at 1410, it is determined to interpret the next received WebSocket frame that includes the control byte sequence as not including a control message. For example, payload data contents of a subsequently received WebSocket frame are forwarded to a destination application such as web application 136 of FIG. 1C. In some embodiments, the WebSocket frame that only includes the control byte sequence in its payload was sent in step 1310 of FIG. 13 and the subsequent WebSocket frame to be interpreted as not a control message is sent in step 1312 of FIG. 13.

If at 1404 it is determined that the payload portion of the received WebSocket frame does not include the control byte sequence, at 1412, the WebSocket frame is interpreted as not including a control message. For example, because no special processing is necessary with respect to the interpretation of the payload data of the WebSocket frame, the WebSocket frame may be processed normally as defined in the WebSocket standard. In some embodiments, payload contents of the WebSocket frame are forwarded to a destination application such as web application 136 of FIG. 1C because the WebSocket frame does not include a control byte sequence. In some embodiments, the WebSocket frame interpreted at 1412 was sent in step 1314 of FIG. 13.

In some embodiments, the process of FIG. 14 is only utilized to determine whether a received WebSocket frame includes a control message if the WebSocket frame includes one or more specific data in an opcode portion of the WebSocket frame. For example, according to the WebSocket standard, all WebSocket frames include a 4 bit opcode that specifies how to interpret the payload portion of the WebSocket frame. In some embodiments, if a WebSocket frame includes a control message, the WebSocket frame is required to include an opcode for a "binary frame" (i.e., hex "%x2").

In this case, a receiver of the received WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on the WebSocket frame and, as in the case of step 1412, the WebSocket frame is interpreted as not including a control message.

Although the examples above discuss upgrading an existing HTTP/HTTPS to a WebSocket connection, in some embodiments, another type of connection such as a stream of a SPDY protocol connection is requested to be upgraded to a WebSocket connection. In various embodiments, other protocol such as SPDY may be utilized on top of an established WebSocket connection.

Although the examples above discuss upgrading an existing HTTP/HTTPS connection to a WebSocket connection, in some embodiments, a protocol other than the WebSocket protocol may be used. For example, another protocol that changes an HTTP/HTTPS connection to a bi-directional, full-duplex communication channel may be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for network connection management, comprising:
    a communication interface configured to:
        request Internet Protocol (IP) addresses associated with an initial host identifier of a first network node of a network cluster of a plurality of network nodes;
        receive at the first network node in response to the request a plurality of IP addresses associated with the single initial host identifier, wherein each IP address of the plurality of IP addresses is associated with a corresponding node of the network cluster of the plurality of network nodes and the first network node that receives the plurality of IP addresses is identified by at least one of the received IP addresses; and
        receive from a client a request to establish a network connection with the first network node; and
    a processor coupled with the communication interface and configured to:
        discover for each of the received IP addresses, a different alternate host identifier for each of the different received IP addresses, wherein each of the different alternate host identifiers is an alternative to the initial host identifier associated with all of the received IP addresses, wherein discovering each of the discovered alternate host identifiers includes performing a reverse DNS lookup;
        determine whether to redirect the network connection to a second network node of the network cluster;
        identify which one of the plurality of the different alternate host identifiers corresponds to the first network node that received the plurality of IP addresses; and
        in the event it is determined that the network connection should be redirected, select one of the discovered alternate host identifiers that is selected to be different than the identified alternate host identifier of the first network node that received the request from the client, as a redirect destination identifier and provide to the client the selected alternate host identifier that is different than the identified alternate host identifier of the first network node as the redirect destination identifier, wherein providing to the client the selected alternate host identifier as the redirect destination identifier includes utilizing a WebSocket protocol and in response to receiving the selected alternate host identifier, the client establishes a connection with a network node associated with the selected host identifier.

2. The system of claim 1, wherein the plurality of network nodes of the network cluster provide redundant functionality that allows the network connections of the plurality of network nodes to be redirected among the plurality of network nodes to achieve load balancing.

3. The system of claim 1, wherein each of the received IP addresses identify each network node of the network cluster.

4. The system of claim 1, wherein the request for the IP addresses is provided to a DNS server.

5. The system of claim 1, wherein the request to establish the network connection includes a request to establish a WebSocket connection.

6. The system of claim 1, wherein the processor is further configured to establish the network connection with the client.

7. The system of claim 1, wherein each of the discovered alternate host identifiers of the received IP addresses identifies a network node of the network cluster.

8. The system of claim 1, wherein discovering each of the discovered alternate host identifiers includes matching a result of the DNS lookup with a string pattern.

9. The system of claim 1, wherein determining whether to redirect the network connection includes determining a determined performance indicator of the first network node.

10. The system of claim 1, wherein determining whether to redirect the network connection includes comparing a determined performance indicator of the first network node with another performance indicator of another network node of the network cluster.

11. The system of claim 1, wherein determining whether to redirect the network connection includes determining whether a difference between a determined performance indicator of the first network node with another performance indicator of another network node of the network cluster is above a threshold range.

12. The system of claim 1, wherein the processor is further configured to identify which of the received IP addresses corresponds to the first network node.

13. The system of claim 1, wherein selecting the one of the discovered alternate host identifiers as the redirect destination identifier includes analyzing performance indicators received at the first network node from other network nodes of the network cluster.

14. The system of claim 1, wherein providing to the client the selected alternate host identifier as the redirect destination identifier includes providing a redirect response in response to the request to establish the network connection.

15. The system of claim 1, wherein providing to the client the selected alternate host identifier as the redirect destination identifier includes utilizing a WebSocket protocol extension negotiated during initialization of the network connection.

16. The system of claim 1, wherein the first network node is a WebSocket gateway that facilitates WebSocket protocol communication between the client and another system.

17. The system of claim 1, wherein at least one of the received IP addresses is a virtual IP address that maps to another IP address of one network node of the network cluster.

18. A method for network connection management, comprising:
- requesting Internet Protocol (IP) addresses associated with an initial host identifier of a first network node of a network cluster of a plurality of network nodes;
- receiving at the first network node in response to the request a plurality of IP addresses associated with the single initial host identifier, wherein each IP address of the plurality of IP addresses is associated with a corresponding node of the network cluster of the plurality of network nodes and the first network node that receives the plurality of IP addresses is identified by at least one of the received IP addresses;
- discovering for each of the received IP addresses, a different alternate host identifier for each of the different received IP addresses, wherein each of the different alternate host identifiers is an alternative to the initial host identifier associated with all of the received IP addresses, wherein discovering each of the discovered alternate host identifiers includes performing a reverse DNS lookup;
- receiving from a client a request to establish a network connection with the first network node;
- determining whether to redirect the network connection to a second network node of the network cluster;
- identifying which one of the plurality of the different alternate host identifiers corresponds to the first network node that received the plurality of IP addresses; and
- in the event it is determined that the network connection should be redirected, selecting one of the discovered alternate host identifiers that is selected to be different than the identified alternate host identifier of the first network node that received the request from the client as a redirect destination identifier and providing to the client the selected alternate host identifier that is different than the identified alternate host identifier of the first network node as the redirect destination identifier, wherein providing to the client the selected alternate host identifier as the redirect destination identifier includes utilizing a WebSocket protocol and in response to receiving the selected alternate host identifier, the client establishes a connection with a network node associated with the selected host identifier.

19. A computer program product for network connection management, the computer program product being embodied in a tangible non-transitory computer readable storage medium and comprising computer instructions for:
- requesting Internet Protocol (IP) addresses associated with an initial host identifier of a first network node of a network cluster of a plurality of network nodes;
- receiving at the first network node in response to the request a plurality of IP addresses associated with the single initial host identifier, wherein each IP address of the plurality of IP addresses is associated with a corresponding node of the network cluster of the plurality of network nodes and the first network node that receives the plurality of IP addresses is identified by at least one of the received IP addresses;
- discovering for each of the received IP addresses, a different alternate host identifier for each of the different received IP addresses, wherein each of the different alternate host identifiers is an alternative to the initial host identifier associated with all of the received IP addresses, wherein discovering each of the discovered alternate host identifiers includes performing a reverse DNS lookup;
- receiving from a client a request to establish a network connection with the first network node;
- determining whether to redirect the network connection to a second network node of the network cluster;
- identifying which one of the plurality of the different alternate host identifiers corresponds to the first network node that received the plurality of IP addresses; and
- in the event it is determined that the network connection should be redirected, selecting one of the discovered alternate host identifiers that is selected to be different than the identified alternate host identifier of the first network node that received the request from the client as a redirect destination identifier and providing to the client the selected alternate host identifier that is different than the identified alternate host identifier of the first network node as the redirect destination identifier, wherein providing to the client the selected alternate host identifier as the redirect destination identifier includes utilizing a WebSocket protocol and in response to receiving the selected alternate host identifier, the client establishes a connection with a network node associated with the selected host identifier.

20. The method of claim 18, wherein the plurality of network nodes of the network cluster provide redundant functionality that allows the network connections of the plurality of network nodes to be redirected among the plurality of network nodes to achieve load balancing.

* * * * *